United States Patent
Uchiyama et al.

(10) Patent No.: US 6,701,235 B2
(45) Date of Patent: Mar. 2, 2004

(54) SUSPENSION CONTROL SYSTEM

(75) Inventors: Masaaki Uchiyama, Tokyo (JP); Toru Uchino, Kanagawa (JP); Nobuyuki Ichimaru, Kanagawa (JP)

(73) Assignee: Tokico Ltd., Kanagawa (JP)

( * ) Notice: Subject to any disclaimer, the term of this patent is extended or adjusted under 35 U.S.C. 154(b) by 0 days.

(21) Appl. No.: 09/941,844

(22) Filed: Aug. 30, 2001

(65) Prior Publication Data

US 2002/0045977 A1 Apr. 18, 2002

(30) Foreign Application Priority Data

Aug. 31, 2000 (JP) .......................... 2000/262993

(51) Int. Cl.$^7$ ............................. B60G 17/015
(52) U.S. Cl. ............. 701/37; 188/299.1; 188/319; 188/280; 280/5.515; 180/902
(58) Field of Search ............ 701/37, 38; 188/319, 188/280, 282, 299.1; 280/707, 5.519, 5.503, 5.515, 5.514, 5.73; 180/902

(56) References Cited

U.S. PATENT DOCUMENTS

| | | | | |
|---|---|---|---|---|
| 5,490,068 A | * | 2/1996 | Shimizu et al. | 280/707 |
| 5,533,597 A | * | 7/1996 | Nezu et al. | 188/319 |
| 5,572,426 A | * | 11/1996 | Sasaki et al. | 280/707 |
| 5,802,486 A | * | 9/1998 | Uchiyama | 701/37 |
| 5,987,368 A | * | 11/1999 | Kamimae et al. | 701/37 |
| 6,003,644 A | * | 12/1999 | Tanaka | 188/266.5 |
| 6,026,339 A | * | 2/2000 | Williams | 701/37 |
| 6,092,011 A | * | 7/2000 | Hiramoto | 701/37 |
| 6,148,252 A | * | 11/2000 | Iwasaki et al. | 701/37 |
| 6,158,746 A | * | 12/2000 | Uchiyama et al. | 280/5.503 |
| 6,176,494 B1 | * | 1/2001 | Ichimaru et al. | 280/5.515 |
| 6,202,011 B1 | * | 3/2001 | Jeon | 701/37 |
| 6,264,212 B1 | * | 7/2001 | Timoney | 280/5.51 |

* cited by examiner

*Primary Examiner*—Thomas G. Black
*Assistant Examiner*—Tuan C To
(74) *Attorney, Agent, or Firm*—Wenderoth, Lind & Ponack, L.L.P.

(57) ABSTRACT

In a suspension control system, a controller previously stores damping force maps (an ordinary road map, a rough road map, and an extremely rough road map) corresponding to road surface conditions (an ordinary road, a rough road, and an extremely rough road) defined by frequency and amplitude of vertical acceleration. The frequency and amplitude of the vertical acceleration are detected, and a damping force map (the ordinary road map, the rough road map, or the extremely rough road map) corresponding to the detected information is selected. Damping force control is effected on the basis of the selected damping force map. Selection of a damping force map according to the frequency and amplitude of the vertical acceleration is also made when a change in the vertical acceleration, i.e. a change in piston speed, is predicted during running on an ordinary road, a rough road or an extremely rough road.

16 Claims, 18 Drawing Sheets

$A_1$ : ORDINARY ROAD MAP
$A_2$ : ROUGH ROAD MAP
$A_3$ : EXTREMELY ROUGH ROAD MAP $D_1$: ΔG "SMALL" MAP
$D_2$: ΔG "INTERMEDIATE" MAP
$D_3$: ΔG "LARGE" MAP $H_1$ : GOOD ROAD MAP
$H_2$ : BAD ROAD MAP

ELECTRIC CURRENT

COMPRESSION ←———→ EXTENSION
DAMPING FORCE

ELECTRIC CURRENT

COMPRESSION ←———→ EXTENSION
DAMPING FORCE

SUSPENSION CONTROL SYSTEM

BACKGROUND OF THE INVENTION

The present invention relates to a suspension control system for use in a vehicle.

One example of conventional suspension control systems is disclosed in Japanese Patent Application Unexamined Publication (KOKAI) No. Hei 7-232530.

The system shown in the above-mentioned publication has a shock absorber of the variable damping characteristic type interposed between sprung and unsprung members of a vehicle; an actuator for changing damping force generated by the shock absorber; a vertical acceleration sensor for detecting the vertical acceleration acting on the sprung mass of the vehicle; a velocity detecting means for detecting the vertical velocity of the sprung mass of the vehicle; and a controller for controlling the actuator by delivering to the actuator a control signal for obtaining damping force corresponding to the velocity signal from the velocity detecting means.

The controller previously stores damping force-current (control signal) characteristics of the shock absorber with respect to one piston speed (e.g. P1 in FIG. 6) as shown in FIG. 25, by way of example. The controller supplies the actuator with an electric current having a magnitude corresponding to the control signal, thereby causing the shock absorber to generate damping force having a magnitude corresponding to the control signal. Further, the controller judges the road surface condition according to the degree of acceleration detected by the vertical acceleration sensor and changes the control gain for the control signal to adjust the control signal according to the road surface condition.

Incidentally, damping force generated by the shock absorber varies with the travel speed of the piston provided in the shock absorber, as shown in FIG. 6. In the prior art, on the assumption that the piston is traveling at one piston speed P1 (e.g. 0.3 m/S), the controller outputs an electric current (control signal) that generates damping force needed at the piston speed of 0.3 m/S.

In this regard, the actual piston speed is changing at all times. However, when damping force control is needed during running on an ordinary road or a slightly rough road (i.e. when the vehicle body is moving upward or downward at a velocity more than a predetermined value), the piston speed is about 0.3 m/S on the average. Therefore, satisfactory control effect is obtained.

However, when the vehicle runs on a rough road or an extremely rough road, the piston speed increases. Consequently, even when the control signal is the same, generated damping force may increase depending upon the surface condition of the road on which the vehicle is running. Therefore, there are cases where the expected control effect cannot be obtained. With the above-described prior art, if damping force control is effected on the basis of the damping force-current (control signal) characteristics shown in FIG. 25 without taking into consideration the piston speed, there may be an excess or deficiency of damping force according to the piston speed such that when the piston speed is high, the damping force becomes excess (over-control), whereas when the piston speed is low, a deficiency of damping force occurs (under-control).

It should be noted that the above-described prior art allows the control gain to be changed according to the piston speed (road surface condition), thereby making it possible to generate damping force as desired to a certain extent according to the piston speed.

The change of the control gain in the above-described prior art gives rise to no problem if the damping characteristics change linearly. However, the actual damping characteristics are non-linear as shown in FIG. 6. Therefore, the damping force control taking into consideration the piston speed suffers low accuracy and is likely to result in over-control or under-control.

SUMMARY OF THE INVENTION

The present invention was made in view of the above-described circumstances. Accordingly, an object of the present invention is to provide a suspension control system capable of generating appropriate damping force in accordance with variations in the piston speed.

The present invention has a shock absorber of the variable damping characteristic type interposed between sprung and unsprung members of a vehicle; an actuator for changing the damping characteristics of the shock absorber; a velocity detecting device for detecting the velocity of the sprung member; a piston speed estimating device for estimating the level of speed of a piston performing sliding movement inside the shock absorber; and a controller having a plurality of damping force maps showing correspondence relation between damping force and an actuator command signal, respectively in correspondence to various levels of the piston speed. The controller obtains necessary damping force from the velocity of the sprung member. Further, the controller selects a damping force map corresponding to the piston speed level estimated by the piston speed estimating device and outputs the actuator command signal on the basis of the selected damping force map.

According to one aspect of the present invention, the piston speed estimating device is a road surface condition detecting device for detecting the road surface condition, and the controller selects a damping force map according to the road surface condition detected by the road surface condition detecting device.

In this case, a sprung vibration detecting device for detecting the acceleration frequency of the sprung member may be provided, so that the road surface condition detecting device detects the road surface condition according to the value of the acceleration frequency.

According to another aspect of the present invention, the piston speed estimating device is a vehicle behavior detecting device for detecting the behavior of the vehicle, and the controller selects a damping force map according to the behavior of the vehicle detected by the vehicle behavior detecting device. The behavior of the vehicle may be dive of the vehicle, squat of the vehicle, or rolling of the vehicle.

According to another aspect of the present invention, the piston speed estimating device is a vehicle position information acquiring device for acquiring information about the position of the vehicle from an external communication device, and the controller selects a damping force map according to the vehicle position information acquired by the vehicle position information acquiring device.

In any of the above-described various modes, a vehicle speed detecting device for detecting the vehicle speed may be provided, so that the controller adds vehicle speed information detected by the vehicle speed detecting device as information for selecting a damping force map.

DETAILED DESCRIPTION OF THE INVENTION

Figure 1:
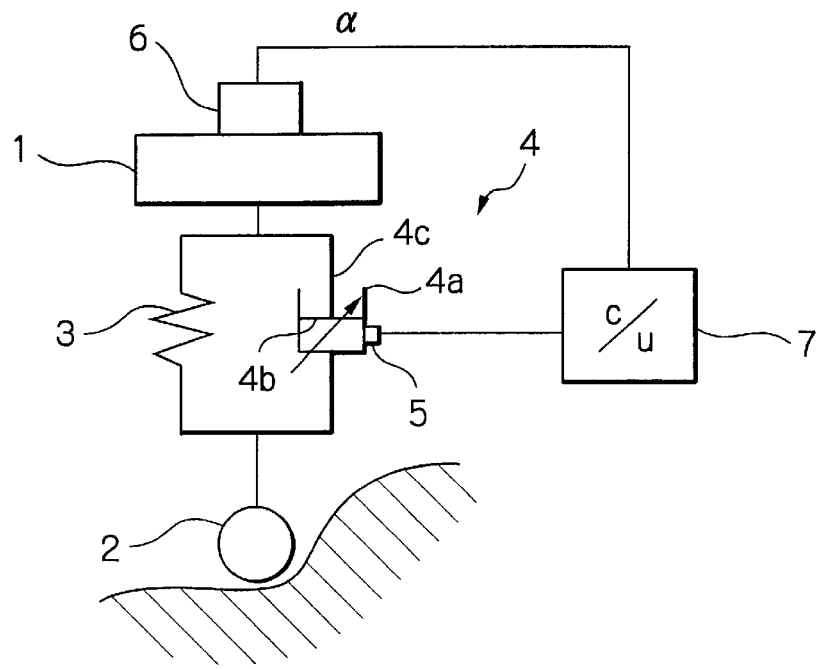
FIG. 1 is a diagram schematically showing a suspension control system according to a first embodiment of the present invention.

A suspension control system according to a first embodiment of the present invention will be described below with reference to FIGS. 1 to 9. In FIG. 1, a spring 3 and a shock absorber 4 having adjustable damping characteristics are interposed in parallel between a vehicle body 1 (sprung mass) and each of four wheels 2 (unsprung mass; only one of them is shown in the figure), which constitute an automobile (vehicle). The spring 3 and the shock absorber 4 support the vehicle body 1. The shock absorber 4 has a cylinder 4a and a piston 4b movably accommodated in the cylinder 4a. The shock absorber 4 further has a damping force generating mechanism (not shown). A piston rod 4c connected to the piston 4b is held by the vehicle body 1. The cylinder 4a is held by a wheel-side (2) member.

Figure 7:
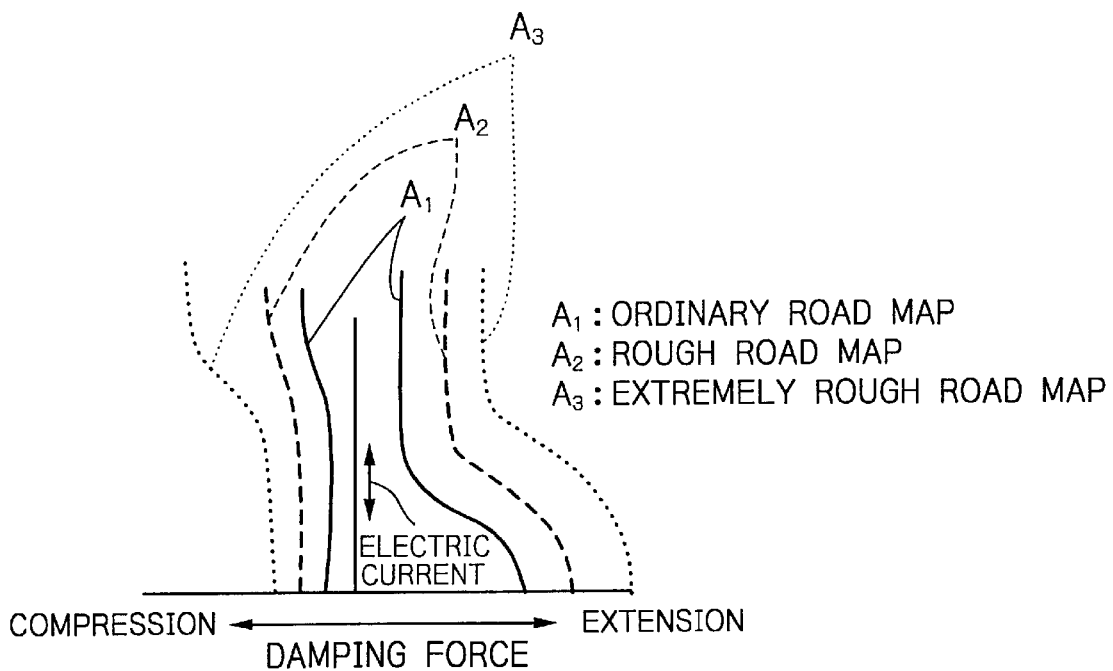
FIG. 7 is a diagram showing damping force-current maps stored in a second memory shown in FIG. 1.

The shock absorber 4 is of the extension/compression inverting type in which, as shown in FIG. 7, when the compression-side damping force has a small value ("soft"), the extension-side damping force is varied between a small value ("soft") and a large value ("hard"), whereas when the extension-side damping force has a small value, the compression-side damping force is varied between a small value and a large value. The shock absorber 4 is provided with an actuator 5 for adjusting the damping force of the shock absorber 4 by actuating a damping force adjusting mechanism (not shown) provided in the shock absorber 4.

An acceleration sensor 6 (sprung mass vibration detecting means) is mounted on the vehicle body 1 to detect the vertical acceleration (sprung mass acceleration) of the vehicle body 1 relative to the absolute coordinate system. The acceleration $\alpha$ (detected signal) detected with the acceleration sensor 6 is supplied to a controller 7. It should be noted that a total of four combinations of shock absorbers 4 and springs 3 are provided to correspond to the four wheels 2; however, only one combination is shown in the figure for the sake of convenience.

Figure 2:
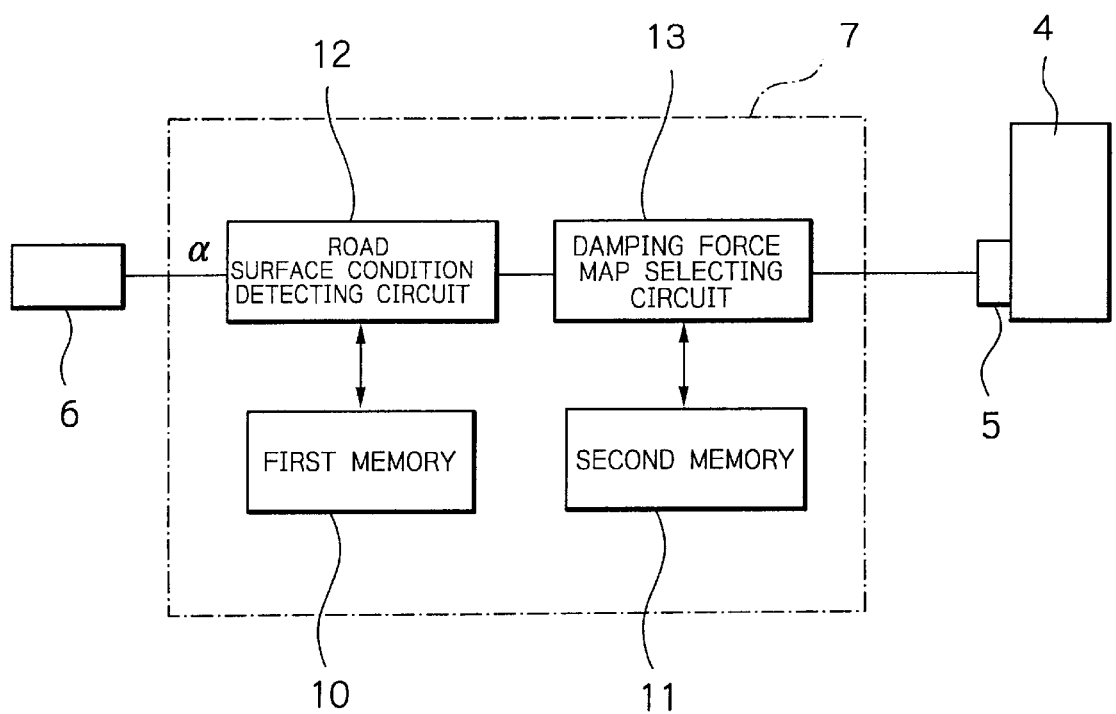
FIG. 2 is a block diagram showing a controller shown in FIG. 1.
Figure 5:
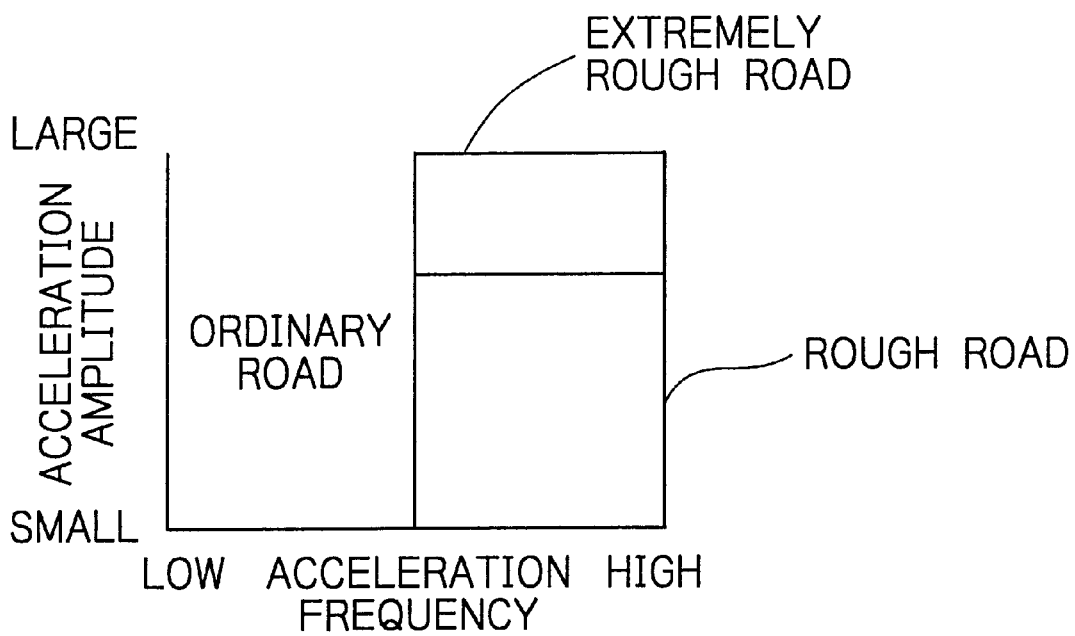
FIG. 5 is a diagram showing a road surface condition judging map stored in a first memory shown in FIG. 1.

As shown in FIG. 2, the controller 7 has a first memory 10, a second memory 11, a road surface condition detecting circuit 12 (road surface condition detecting means), and a damping force map selecting circuit 13. The first memory 10 contains data indicating road surface conditions defined by the acceleration frequency and the acceleration amplitude, as shown in FIG. 5. Road surface conditions are defined by the acceleration frequency and the acceleration amplitude and classified into three categories, i.e. an ordinary road, a rough road, and an extremely rough road.

In this embodiment, a road is defined as an "ordinary road" when the frequency of acceleration detected with the vertical acceleration sensor 6 during running on the road is in the range of "intermediate" to "low" and the acceleration amplitude is in the range of "small" to "large".

A road is defined as a "rough road" when the acceleration frequency is in the range of "intermediate" to "high" and the acceleration amplitude is in the range of "small" to slightly larger than "intermediate".

A road is defined as an "extremely rough road" when the acceleration frequency is in the range of "intermediate" to "high" and the acceleration amplitude is in the range of slightly larger than "intermediate" to "large".

The second memory 11 contains, as shown in FIG. 7, an ordinary road map A1, a rough road map A2 and an extremely rough road map A3 (damping force maps) showing damping force-current characteristics. In the diagram, the electric current provides an actuator command signal. The damping force-current characteristics shown in the diagram are of the extension/compression inverting type, as has been stated above. The ordinary road map A1, the rough road map A2 and the extremely rough road map A3 show damping force increasing in the order mentioned with respect to an electric current of equal magnitude.

The road surface condition detecting circuit 12 is supplied with the acceleration α detected by the acceleration sensor 6. The road surface condition detecting circuit 12 collates the frequency and amplitude of the acceleration α with the storage contents of the first memory 10 to detect the road surface condition of a road on which the vehicle is running (i.e. ordinary road, rough road, or extremely rough road), and outputs the result of detection to the damping force map selecting circuit 13.

Each of the maps A1 to A3 is prepared from the relationship between the command current value given to the actuator and damping force when the piston speed is at a predetermined level. For example, the ordinary road map A1, the rough road map A2 and the extremely rough road map A3 are prepared on the basis of the characteristics of the shock absorber when the piston speed is 0.1 m/S, 0.3 m/S and 0.6 m/S, respectively.

Although in the foregoing description the piston speed is divided into three levels, by way of example, it should be noted that the number of piston speed levels is not necessarily limited to three. If the piston speed is divided into more finely defined levels, more accurate control can be performed.

The damping force map selecting circuit 13 selects a corresponding damping force map on the basis of data concerning the road surface condition (ordinary road, rough road, or extremely rough road) from the road surface condition detecting circuit 12. The controller 7 obtains an actuator command signal on the basis of the damping force map selected by the damping force map selecting circuit 13 and outputs the actuator command signal to the actuator 5.

Figure 3:
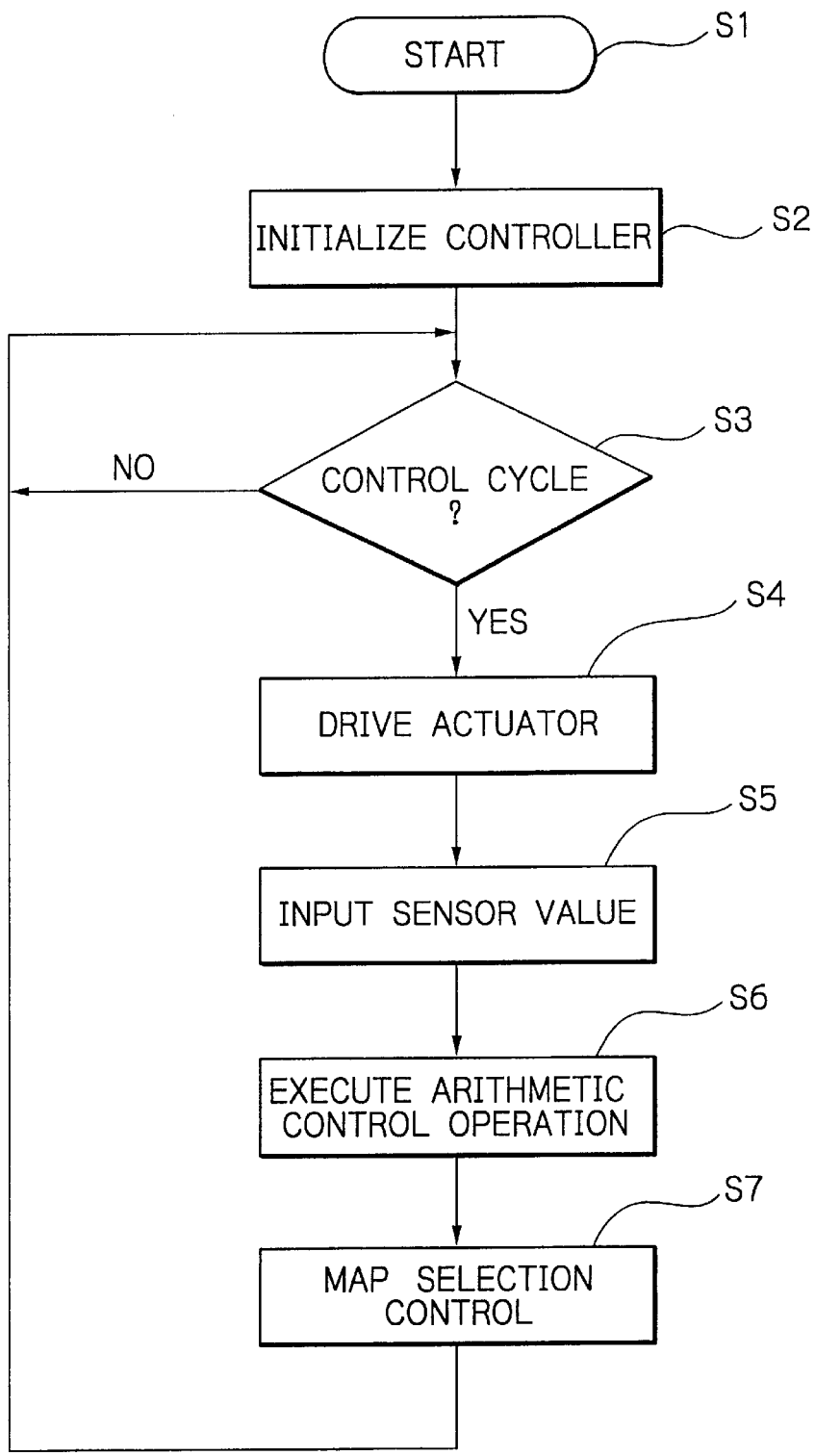
FIG. 3 is a flowchart showing the contents of arithmetic processing executed by the controller shown in FIG. 1.

The controller 7 having the above-described arrangement operates as shown in FIG. 3. When supplied with electric power upon starting the engine of the vehicle (step S1), the controller 7 first executes initialization (step S2) and then judges whether or not the control cycle has been completed (step S3). Step S3 is repeated until it is judged that the control cycle has been completed.

If it is judged at step S3 that the control cycle has been completed, the controller 7 outputs the contents of the operation executed in the previous control cycle to the actuator 5 to drive it (step S4). Subsequently, the controller 7 reads detected information from the acceleration sensor 6 and so forth at step S5. Next, the controller 7 executes an arithmetic control operation (step S6) on the basis of the information read at step S5. Subsequently to step S6, the controller 7 executes a map selection control subroutine (step S7).

Figure 4:
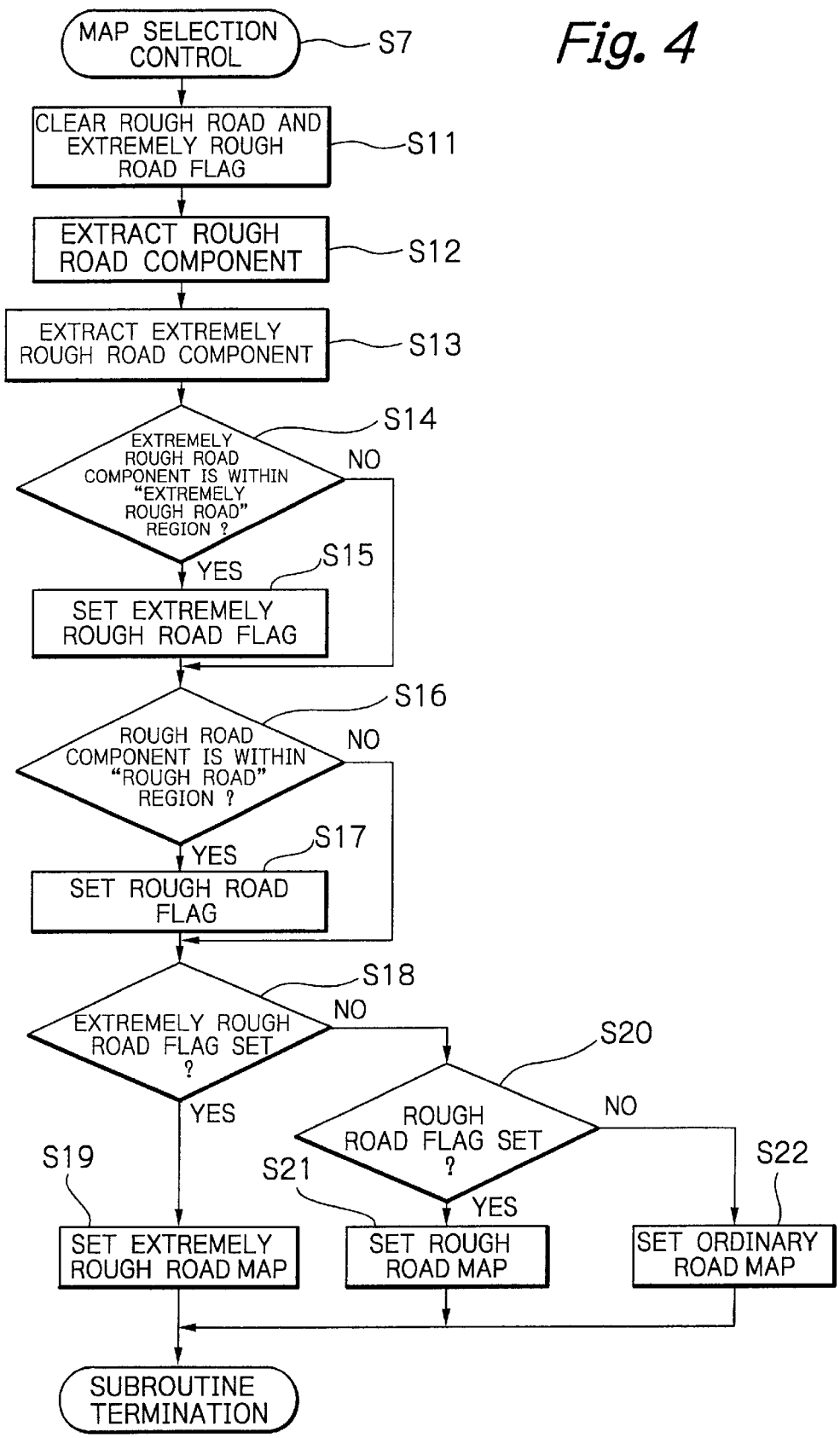
FIG. 4 is a flowchart showing a map selection control subroutine shown in FIG. 3.

The map selection control subroutine executed at step S7 will be described with reference to FIG. 4.

First, the controller 7 clears an extremely rough road flag and a rough road flag (step S11). Then, the controller 7 extracts a rough road component (frequency and amplitude) and an extremely rough road component (frequency and amplitude) successively (steps S12 and S13) from the detected information from the acceleration sensor 6 input at step S5.

Subsequently, the controller 7 judges at step S14 whether or not the extremely rough road component (frequency and amplitude) is within the region indicating "extremely rough road", which is shown in FIG. 5.

If YES is the answer at step S14 (i.e. the extremely rough road component is within the "extremely rough road" region), the controller 7 sets an extremely rough road flag (step S15).

Upon completion of the processing at step S15, or if NO is the answer at step S14, the controller 7 judges (step S16) whether or not the rough road component (frequency and amplitude) is within the region indicating "rough road", which is shown in FIG. 5.

If YES is the answer at step S16 (i.e. the rough road component is within the "rough road" region), the controller 7 sets a rough road flag (step S17).

Upon completion of the processing at step S17, or if NO is the answer at step S16, the controller 7 judges whether or not the extremely rough road flag has been set (step S18). If YES is the answer at step S18, the controller 7 selects the extremely rough road map A3 at step S19 to use it for damping force control.

If NO is the answer at step S18, the controller 7 judges whether or not the rough road flag has been set (step S20). If YES is the answer at step S20, the rough road map A2 is set (step S21). If NO is the answer at step S20, the ordinary road map A1 is set (step S22).

Figure 6:
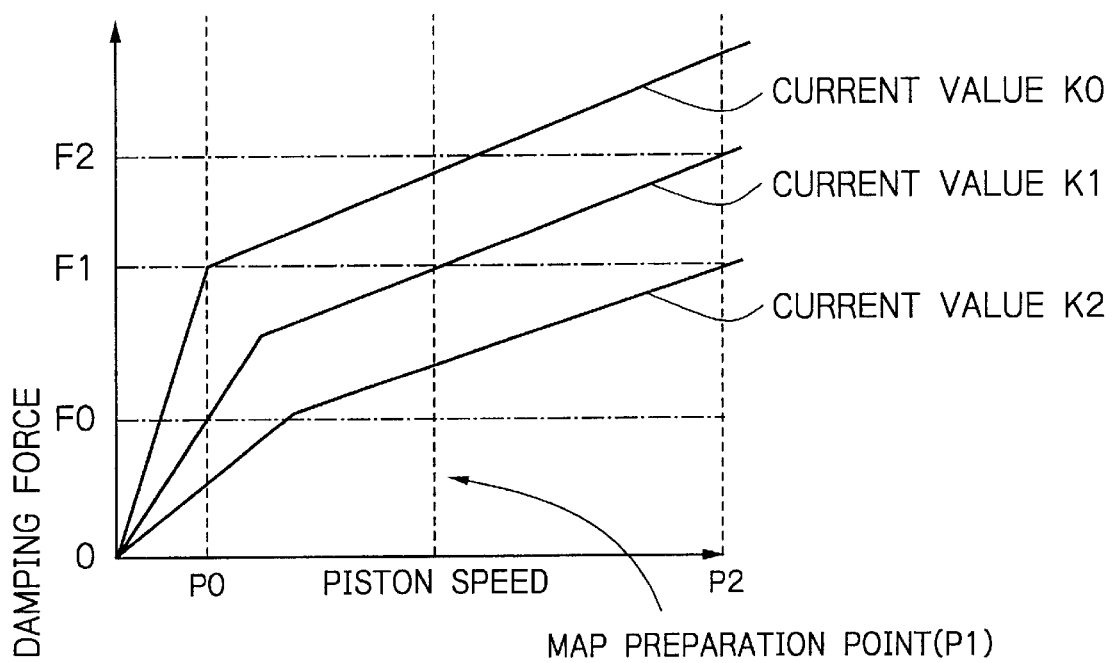
FIG. 6 is a diagram showing extension-side damping force characteristics of a shock absorber shown in FIG. 1.

Here, the damping force maps (the ordinary road map A1, the rough road map A2 and the extremely rough road map A3) are damping force-current conversion tables for determining an actuator command signal to output necessary damping force determined by the control operation. As shown in FIG. 6, when the necessary damping force is F1, a current value K1 (actuator command signal) is found for the piston speed P1.

Figure 25:
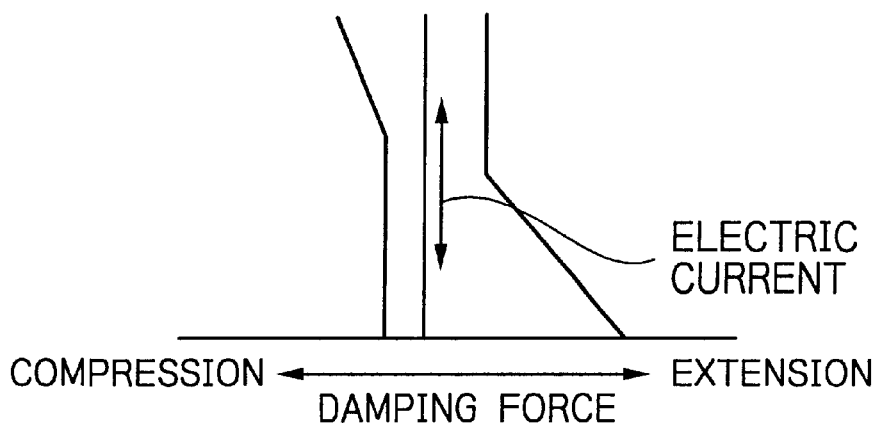
FIG. 25 is a diagram showing an example of a damping force map used in the prior art.

In the above-described prior art, damping force control is effected by using the characteristics (damping force map) shown in FIG. 25. The map is prepared on the basis of a certain piston speed (e.g. P1 in FIG. 6). Therefore, when the actual piston speed is low, for example, at speed P0 (P0<P1) as shown in FIG. 6, damping force obtained with the current value K1 is F0, which is smaller than the necessary damping force F1 (i.e. F0<F1). This results in a deficiency in the amount of suspension control for vibration suppression and so forth.

Conversely, when the actual piston speed is high, e.g. at speed P2 (P2>P1) as shown in FIG. 6, damping force obtained with the current value K1 is F2, which is larger than the necessary damping force F1 (i.e. F2>F1). As a result, the amount of suspension control for vibration suppression and so forth becomes excess.

With the prior art, damping force controlled by driving the actuator 5 may become excess or insufficient depending on the piston speed, as has been stated above. In contrast, this embodiment is based on the fact that the road surface condition (ordinary road, rough road, or extremely rough road) is in correspondence relation to the piston speed. More specifically, as has been described above, the road surface condition (ordinary road, rough road, or extremely rough road) is judged, and the piston speed is estimated to be one of three levels, i.e. "low", "intermediate", and "high", from the result of the judgment.

Then, the controller 7 selects a damping force map (the ordinary road map A1, the rough road map A2, or the extremely rough road map A3) according to the estimated level of piston speed, i.e. the result of judgment of the road surface condition (ordinary road, rough road, or extremely rough road), and effects damping force control by using the selected damping force map. Accordingly, the desired damping force can be ensured without being affected by variations in the piston speed. Thus, there is no excess or deficiency of damping force as caused by variations in the piston speed in the prior art.

To examine the control effect, vertical acceleration, relative velocity between the sprung mass and the unsprung mass, and damping force were measured for this embodiment, the above-described prior art (a control system having a single damping force-current map), and a control system performing ideal sky-hook control. The results of the measurement, shown in FIGS. 8 and 9, confirm that this embodiment can perform damping force control close to the ideal sky-hook control.

Here, let us explain the suspension control system according to the prior art and the control based on the sky-hook control (sky-hook damper theory), for which the above-described measurement was carried out. The above-described prior art effects control approximated to the control method based on the sky-hook damper theory (i.e. the prior art performs control according to control rules 1, which will be described later).

According to the sky-hook control (sky-hook damper theory), the damping coefficient C1 of the shock absorber (damper) provided between the vehicle body and the axle is obtained as follows.

Assuming that:
V: the vertical absolute velocity of the vehicle body (sprung mass);
X: the vertical absolute velocity of the axle (unsprung mass);
CZ: the damping coefficient of the shock absorber (damper) provided between the vehicle body and one point in the absolute coordinate system;
if the following condition is satisfied;

$$V(V-X)>0$$

the damping coefficient C1 is determined as follows:

$$C1=CZ \times V/(V-X) \quad (1)$$

If the following condition is satisfied;

$$V(V-X)<0$$

the damping coefficient C1 is determined as follows:

$$C1=0 \quad (2)$$

In the above-described suspension control system of the prior art, a vertical acceleration acting on the sprung mass is detected with only the vertical acceleration sensor provided on the vehicle body without using a stroke sensor, and the damping coefficient C1 is determined on the basis of the detected vertical acceleration as stated below. Further, in place of the actual relative velocity (V−X) between the sprung mass and the unsprung mass in the above Equation (1), the relative velocity M obtained from the vertical acceleration signal is used as one that is approximate to the actual relative velocity (V−X) according to the following control rules (the above-mentioned control rules 1). That is, the prior art suspension control system obtains the damping coefficient C1 generally on the basis of the sky-hook control (sky-hook damper theory) as follows:

If V(V−X)>0, $$C1=K \times V/M \quad (1a)$$

If V(V−X)<0, $$C1=C\text{min} \quad (2a)$$

In the above Equations (1a) and (2a), K is a constant, and Cmin≠0.

Figure 8:
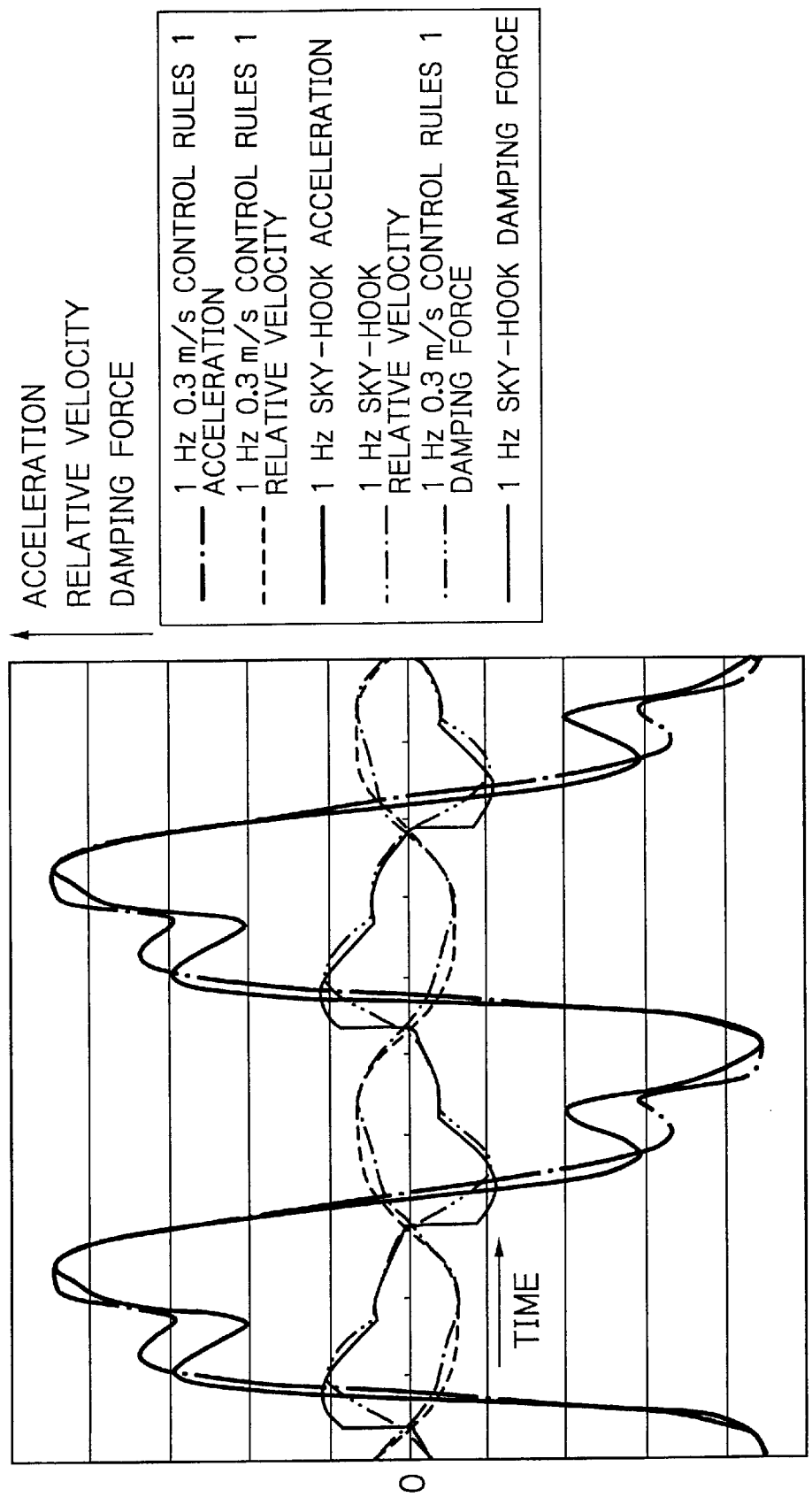
FIG. 8 is a characteristic chart showing examples of measurement carried out for the prior art according to control rules 1 and the sky-hook control at a vibration frequency of 1 Hz.

FIG. 8 shows comparatively the results of measurement carried out for the prior art (a control system having a single damping force-current map) and the control system performing ideal sky-hook control (hereinafter referred to as "sky-hook control" occasionally). In the measurement, the vibration frequency is 1 Hz, and a damping force-current map for the piston speed of 0.3 m/s is used. As shown in FIG. 8, the prior art and the sky-hook control are approximately equal to each other in terms of acceleration indicating the control effect.

Figure 9:
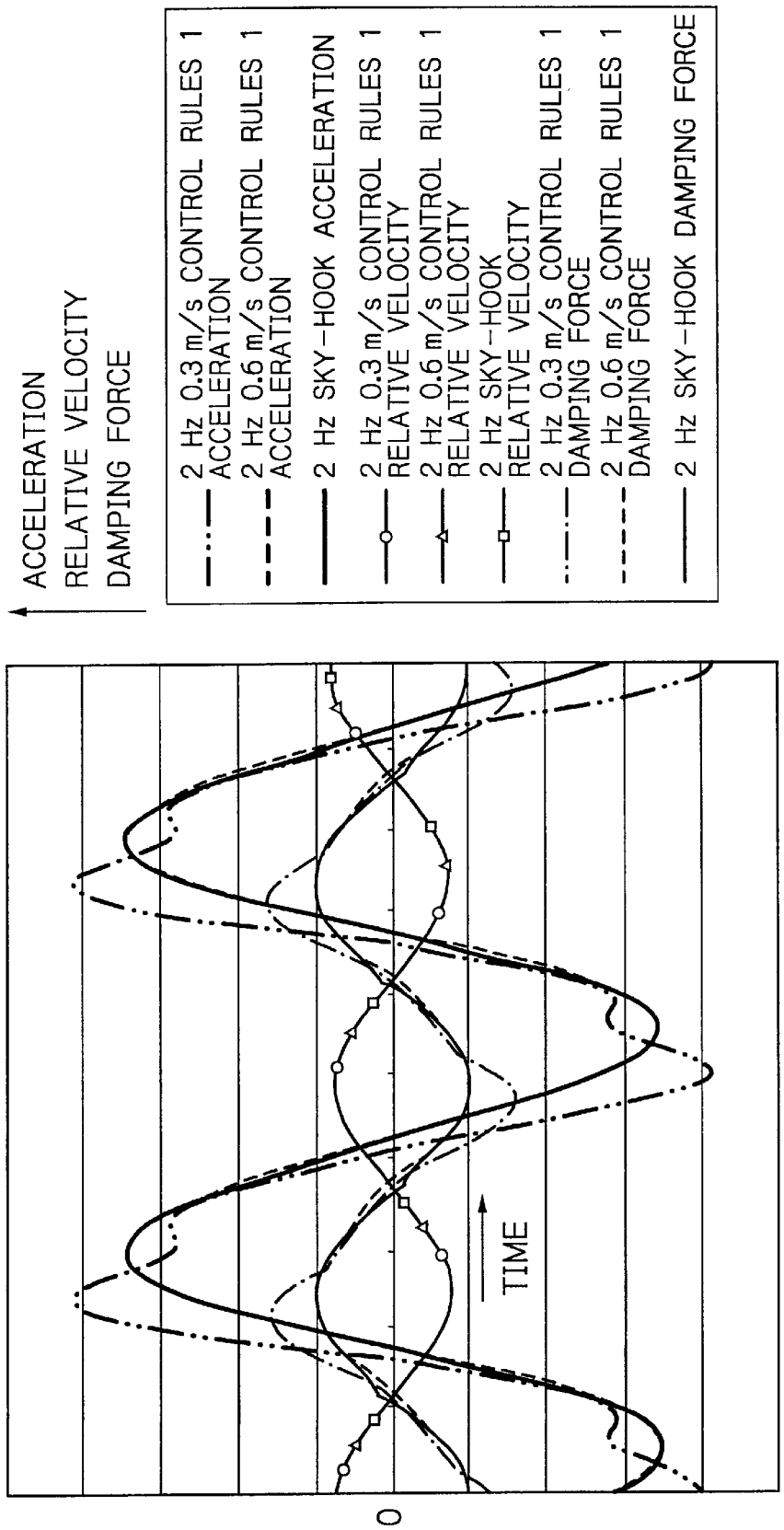
FIG. 9 is a characteristic chart showing examples of measurement carried out for the prior art according to control rules 1, the sky-hook control and a first embodiment at a vibration frequency of 2 Hz.

If the vibration frequency is raised to 2 Hz with the other settings kept the same as those for the measurement results shown in FIG. 8, the result of measurement for the prior art deviates from the result of measurement for the sky-hook control as shown in FIG. 9, i.e. as shown by the segment representing "2 Hz 0.3 m/s control rules 1 acceleration" (prior art); the segment representing "2 Hz sky-hook acceleration" (sky-hook control); the segment representing "2 Hz 0.3 m/s control rules 1 damping force" (prior art); and the segment representing "2 Hz sky-hook damping force" (sky-hook control). With the prior art, acceleration increases in comparison to the sky-hook control, causing the ride quality to be degraded.

On the other hand, if a damping force-current map for the piston speed of 0.6 m/s is used, the control effect is approximately the same as that obtained by the sky-hook control as shown in FIG. 9, i.e. as shown by the segments representing "2 Hz 0.6 m/s control rules 1 acceleration" and "2 Hz 0.6 m/s control rules 1 damping force".

Thus, it was possible to verify that the selective use of a damping force map according to the piston speed allows damping force control to be performed substantially in conformity to the ideal sky-hook control and hence permits appropriate damping force to be generated in accordance with variations in the piston speed.

According to the first embodiment, when a change in the vertical acceleration, i.e. a change in the level of the piston speed, is predicted during running on an ordinary road, a rough road or an extremely rough road, the frequency and amplitude of the vertical acceleration are detected, and a damping force map (the ordinary road map A1, the rough road map A2, or the extremely rough road map A3) is selected according to the frequency and amplitude of the vertical acceleration. Then, damping force control is effected on the basis of the selected damping force map. Therefore, it is possible to generate damping force appropriately in accordance with variations in the piston speed.

In the first embodiment, damping force control is effected without providing a vehicle height sensor. Therefore, the number of components reduces correspondingly, and the arrangement becomes simplified. In addition, the system can be reduced in cost.

In the first embodiment, the system has a sprung vibration detecting means for detecting the acceleration frequency of the sprung member, and the road surface condition detecting means detects the road surface condition according to the value of the acceleration frequency detected by the sprung vibration detecting means. It should be noted, however, that the present invention is not necessarily limited to the described arrangement. For example, the road surface condition may be detected by using an ultrasonic sensor or a camera eye. It is also possible to use other methods for detecting the road surface condition.

Next, a second embodiment of the present invention will be described with reference to FIGS. 10 to 12.

It should be noted that the same members or portions as those shown in FIGS. 1 to 9 are denoted by the same reference numerals, and a description thereof is omitted appropriately.

Figure 10:
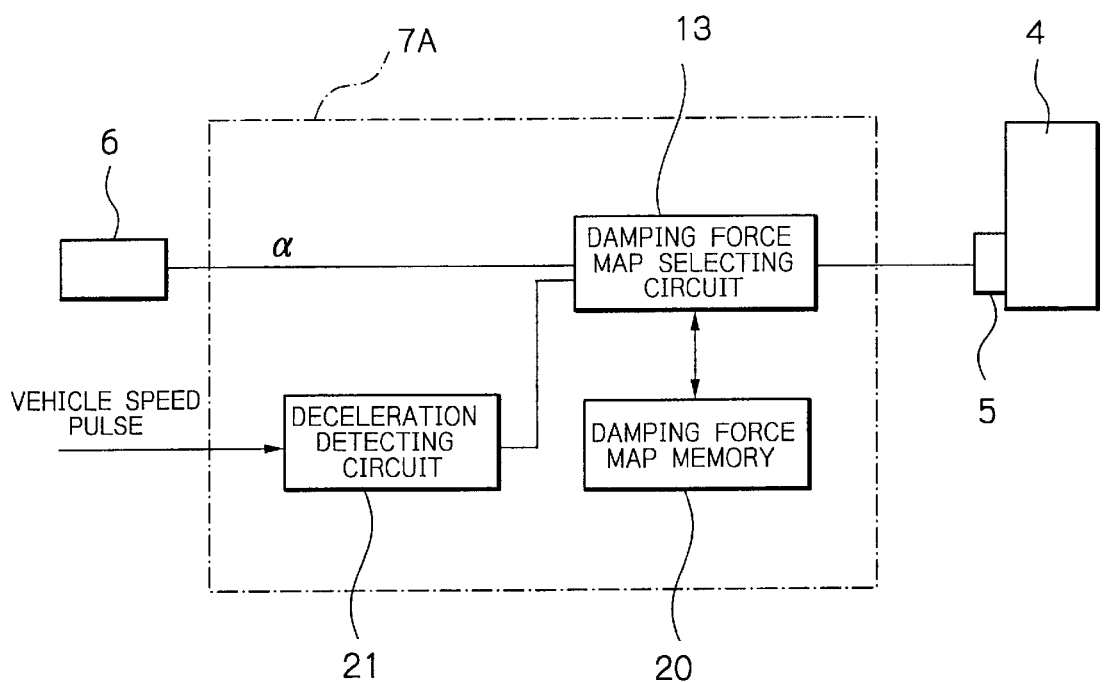
FIG. 10 is a block diagram showing a controller of a suspension control system according to a second embodiment of the present invention.
Figure 11:
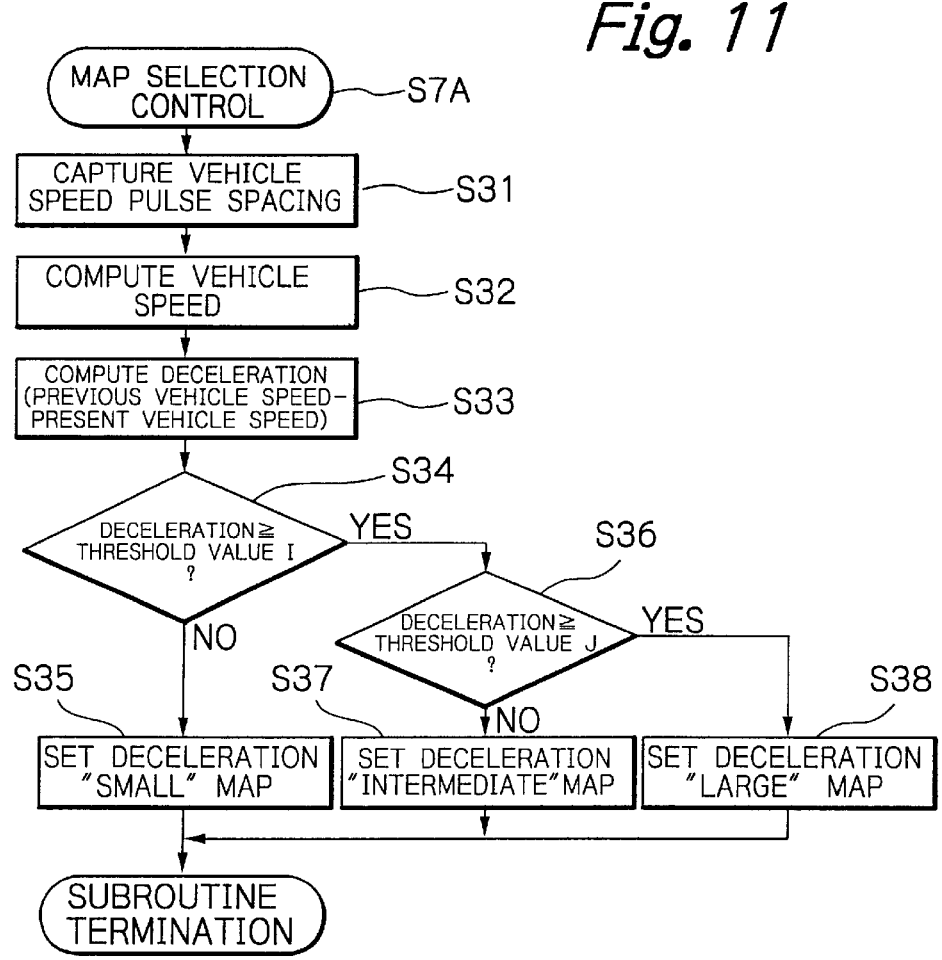
FIG. 11 is a flowchart showing a map selection control subroutine executed by the controller shown in FIG. 10.

As shown in FIG. 10, the controller 7A in the second embodiment has a damping force map memory 20, a deceleration detecting circuit 21 (an example of vehicle behavior detecting means), and a damping force map selecting circuit 13.

Figure 12:
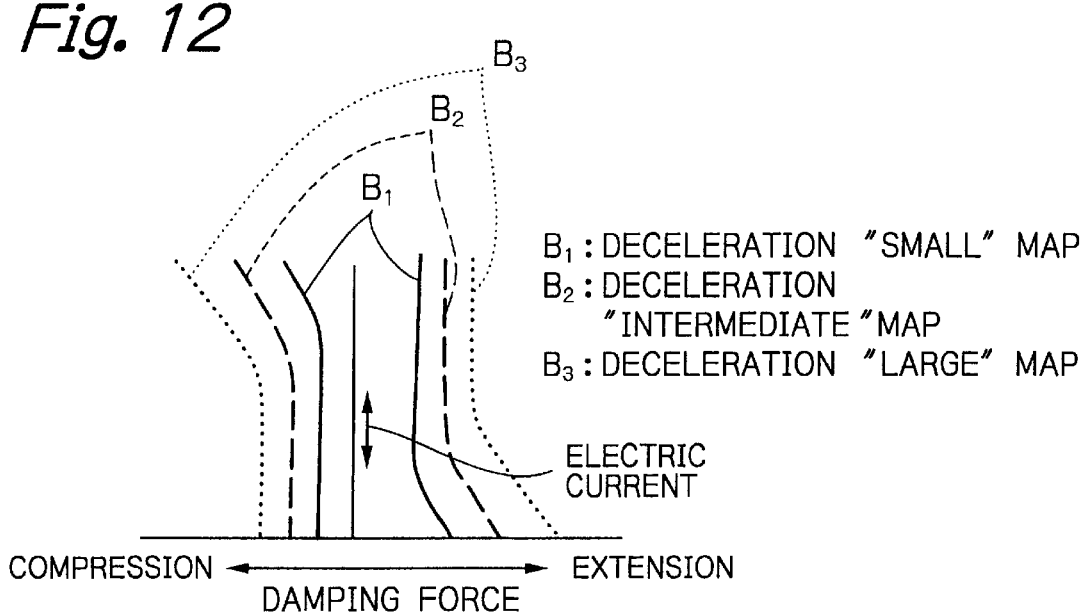
FIG. 12 is a diagram showing damping force maps stored in a damping force map memory shown in FIG. 10.

As shown in FIG. 12, the damping force map memory 20 contains a deceleration "small" map B1, a deceleration "intermediate" map B2, and a deceleration "large" map B3, which show damping force-current characteristics (extension/compression inverting type). The deceleration "small" map B1, the deceleration "intermediate" map B2 and the deceleration "large" map B3 show damping force increasing in the order mentioned with respect to an electric current (actuator command signal) of equal magnitude.

The deceleration detecting circuit 21 obtains the vehicle speed from the spacing of vehicle speed pulses output from a vehicle speed pulse generating means (not shown) and also obtains the degree of deceleration from the difference between the previous vehicle speed (detected in the previous control cycle) and the present vehicle speed. When the deceleration detected by the deceleration detecting circuit 21 has a large value, it is expected that dive of large value will occur. When the value of the deceleration is small, dive of relatively small value is expected to occur. Hence, the deceleration detecting circuit 21 performs detection of dive. Thus, the deceleration detecting circuit 21 constitutes a vehicle behavior detecting means.

The damping force map selecting circuit 13 compares the deceleration from the deceleration detecting circuit 21 with threshold values i and j and selects a damping force map (the deceleration "small" map B1, the deceleration "intermediate" map B2, or the deceleration "large" map B3) from the damping force map memory 20 according to the result of the comparison. The damping force map selecting circuit 13 further obtains an actuator command signal on the basis of the selected damping force map and the acceleration signal from the acceleration sensor 6 and outputs the actuator command signal to the actuator 5.

The controller 7A arranged as stated above performs main routine control similar to that shown in FIG. 3. In a map selection control subroutine (step S7A) provided in place of the map selection control subroutine (step S7) in the first embodiment, as shown in FIG. 11, the controller 7A captures vehicle speed pulse spacing information (step S31). Then, the vehicle speed is obtained from the vehicle speed pulse spacing information (step S32). Subsequently to step S32, the degree of deceleration is obtained from the difference between the previous vehicle speed (detected in the previous control cycle) and the present vehicle speed (step S33).

Next, a judgment is made as to whether the deceleration is not less than the threshold value i (step S34). If NO is the answer at step S34 (i.e. the deceleration is less than the threshold value i; the deceleration is small, that is, it is expected that dive of relatively small magnitude will occur), the deceleration "small" map B1 (corresponding to the piston speed P0 in FIG. 6) is set (selected)(step S35). Then, the controller 7A effects damping force control on the basis of the set deceleration "small" map B1.

If YES is the answer at step S34 (i.e. the deceleration is not less than the threshold value i), a judgment is made as to whether the deceleration is not less than the threshold value j (step S36).

If NO is the answer at step S36 (i.e. the deceleration is less than the threshold value j), the deceleration "intermediate" map B2 (corresponding to the piston speed P1 in FIG. 6) is set (selected)(step S37). Then, the controller 7A effects damping force control on the basis of the deceleration "intermediate" map B2.

If YES is the answer at step S36 (i.e. the deceleration is not less than the threshold value j; the deceleration is large, that is, it is expected that dive of relatively large magnitude will occur), the deceleration "large" map B3 (corresponding to the piston speed P2 in FIG. 6) is set (selected)(step S38). Then, the controller 7A effects damping force control on the basis of the deceleration "large" map B3.

According to the second embodiment, when it is predicted that the deceleration of the vehicle will cause dive, or a change in the level of the piston speed, the degree of deceleration, that is, dive (an example of vehicle behavior), is detected, and a damping force map (the deceleration "small" map B1, the deceleration "intermediate" map B2, or the deceleration "large" map B3) corresponding to the level of the deceleration (dive) is selected. Then, damping force control is effected on the basis of the selected damping force map. Therefore, it is possible to generate damping force appropriately in accordance with a change in the level of the piston speed.

In the second embodiment, the vehicle speed is calculated from the spacing of the vehicle speed pulses, and the degree of deceleration is obtained from the difference between the previous vehicle speed and the present vehicle speed. The deceleration thus obtained is used for damping force control. However, damping force control may be effected on the basis of the longitudinal acceleration by detecting the degree of longitudinal acceleration directly with an accelerometer, instead of using the above-described arrangement. The system may also be arranged to obtain the rate of change in the longitudinal acceleration, the brake switch detection signal, the brake pressure (brake fluid pressure), the pitch angle, or the pitch angle velocity and to effect damping force control on the basis of the signal thus obtained. It is also possible to effect damping force control on the basis of a combination of the signals indicating the above-described information.

Further, damping force control may be effected for either the extension side or the compression side. It is also possible to effect damping force control for only the front wheels or only the rear wheels.

Figure 13:
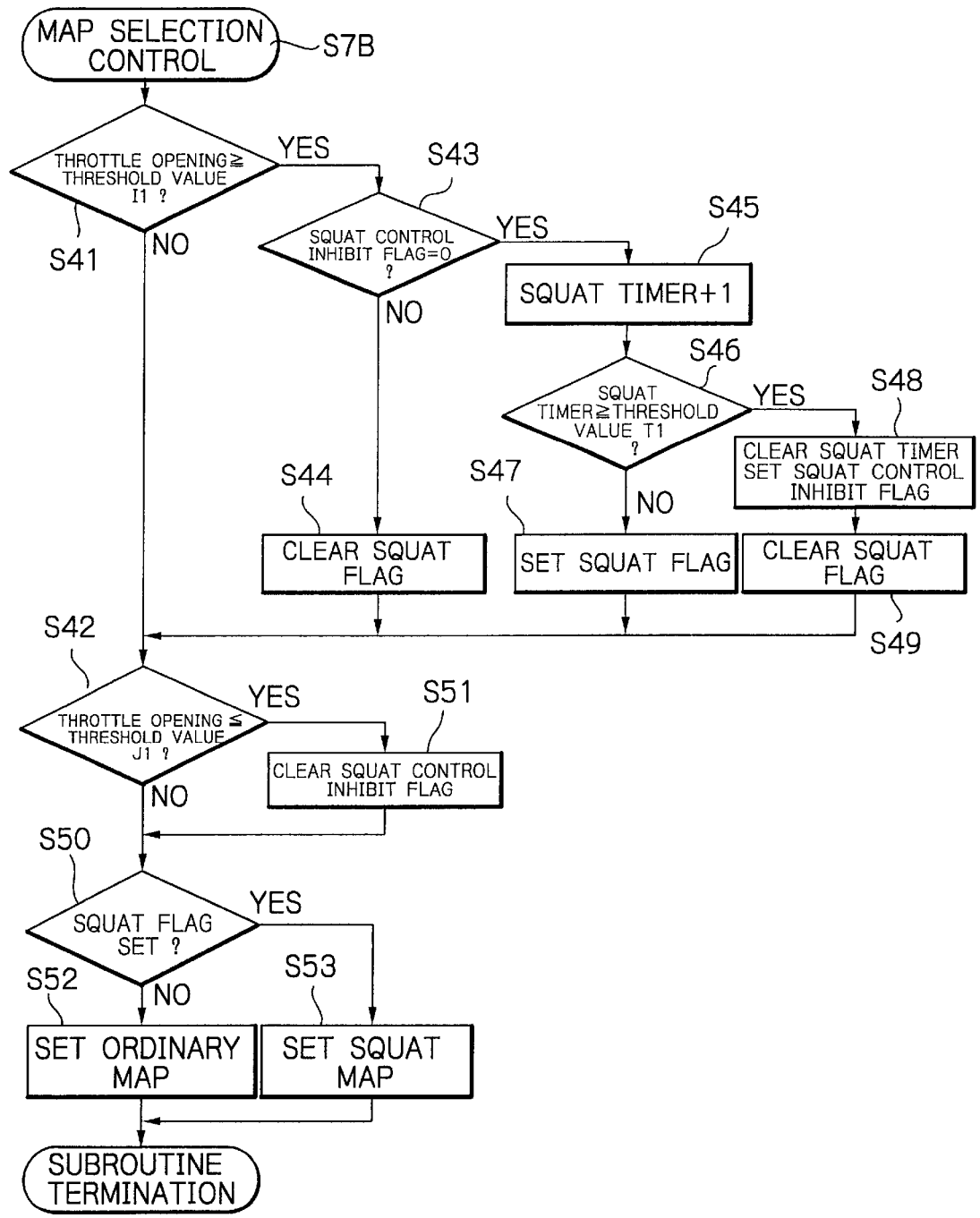
FIG. 13 is a flowchart showing a map selection control subroutine executed by a controller of a suspension control system according to a third embodiment of the present invention.

Next, a third embodiment of the present invention will be described with reference to FIGS. 13 and 14.

It should be noted that the same members or portions as those shown in FIGS. 1 to 12 are denoted by the same reference numerals, and a description thereof is omitted appropriately.

The controller (not shown) in the third embodiment has a throttle opening detecting circuit (vehicle behavior detecting means), which is not shown in the figures, in place of the deceleration detecting circuit 21 shown in FIG. 10.

Figure 14:
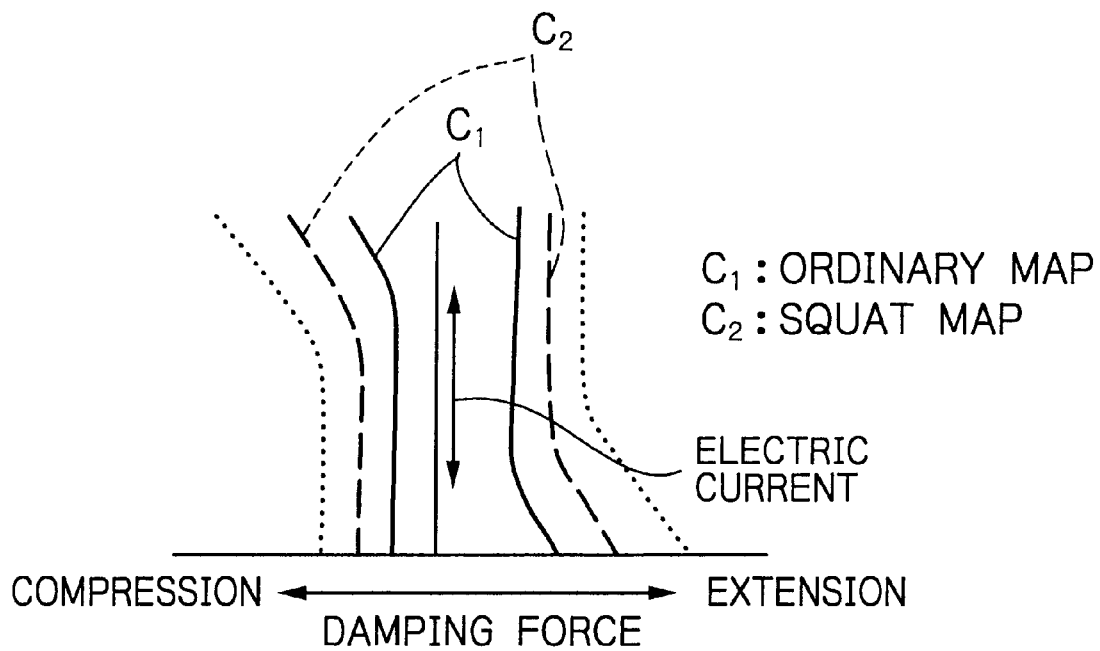
FIG. 14 is a diagram showing damping force maps stored in the controller according to the third embodiment.

The damping force map memory 20 (see FIG. 10) has, as shown in FIG. 14, two damping force-current characteristic curves (extension/compression inverting type) stored therein as an ordinary map C1 and a squat map C2. The ordinary map C1 and the squat map C2 show damping force increasing in the order mentioned with respect to an electric current of equal magnitude.

The throttle opening detecting circuit (not shown) detects the degree of opening of the throttle. When the throttle opening has a large value, it is expected that squat of large value will occur. When the value of the throttle opening is small, squat of relatively small value is expected to occur. Hence, the throttle opening detecting circuit performs detection of squat. Thus, the throttle opening detecting circuit constitutes a vehicle behavior detecting means.

The damping force map selecting circuit 13 (see FIG. 10) compares the throttle opening from the throttle opening detecting circuit with threshold values i1 and j1 and selects a damping force map from the damping force map memory 20 according to the result of the comparison. The damping force map selecting circuit 13 further obtains an actuator command signal on the basis of the selected damping force map and the acceleration signal from the acceleration sensor 6 (see FIG. 10) and outputs the actuator command signal to the actuator.

The controller in the third embodiment performs main routine control similar to that shown in FIG. 3. In a map selection control subroutine (step S7B) provided in place of the map selection control subroutine (step S7) in the first embodiment, as shown in FIG. 13, the controller first judges whether the throttle opening is not less than the threshold value i1 (step S41).

If NO is the answer at step S41 (i.e. the throttle opening<i1), the controller judges whether the throttle opening is not more than the threshold value j1 at step S42. If YES is the answer at step S41, the controller judges whether a squat control inhibit flag has not been set (i.e. the squat control inhibit flag=0) (step S43).

If NO is the answer at step S43 (i.e. the squat control inhibit flag=1; that is, squat control has been inhibited), the controller clears a squat flag (step S44) and proceeds to the above-described step S42.

If YES is the answer at step S43 (i.e. the squat control inhibit flag=0), the controller increments the value of a squat timer by "1" (step S45). Subsequently to step S45, the controller judges whether or not the value (measured time) of the squat timer has reached a value not less than a predetermined threshold value t1 (step S46).

If NO is the answer at step S46 (i.e. the value of the squat timer has not yet reached the threshold value t1), the controller sets the squat flag (step S47) and proceeds to the above-described step S42.

If YES is the answer at step S46 (i.e. the value of the squat timer has already reached the threshold value t1), the controller clears the squat timer and sets the squat control inhibit flag (step S48). Subsequently, the controller clears the squat flag (step S49) and proceeds to the above-described step S42.

If NO is the answer at the above-described step S42 (i.e. j1<throttle opening<i1), the controller judges whether or not the squat flag has been set (step S50). If YES is the answer at step S42 [i.e. throttle opening$\leqq$j1 (<i1)], the controller clears the squat control inhibit flag (step S51) and proceeds to the above-described step S50.

If NO is the answer at step S50, the controller sets the ordinary map C1 (step S52). If YES is the answer at step S50, the controller sets the squat map C2 (step S53).

In the third embodiment, when a predetermined degree of throttle opening has continued for a predetermined of time (i.e. YES is the answer at step S50), it is predicted that squat will occur. Accordingly, the controller selects the squat map C2 and effects damping force control on the basis of the squat map C2. When a predetermined degree of throttle opening does not continue for a predetermined period of time (i.e. NO is the answer at step S50), the controller selects the ordinary map C1 and effects damping force control on the basis of the ordinary map C1.

According to the third embodiment, selection of a damping force map is also made when it is predicted that squat, or a change in the level of the piston speed, will occur owing to the continuation of a predetermined degree of throttle opening for a predetermined period of time. That is, when the occurrence of squat is predicted from the continuation of a predetermined degree of throttle opening for a predetermined period of time, the controller selects a damping force map (the ordinary map C1 or the squat map C2) according to the predicted squat and effects damping force control on the basis of the selected damping force map. Therefore, it is possible to generate damping force appropriately in accordance with a change in the level of the piston speed.

Although in the third embodiment the occurrence of squat is detected from the throttle opening, it should be noted that the present invention is not necessarily limited thereto. The occurrence of squat may be detected on the basis of the longitudinal acceleration, the rate of change in the longitudinal acceleration, etc. It is also possible to detect squat by other methods.

Figure 15:
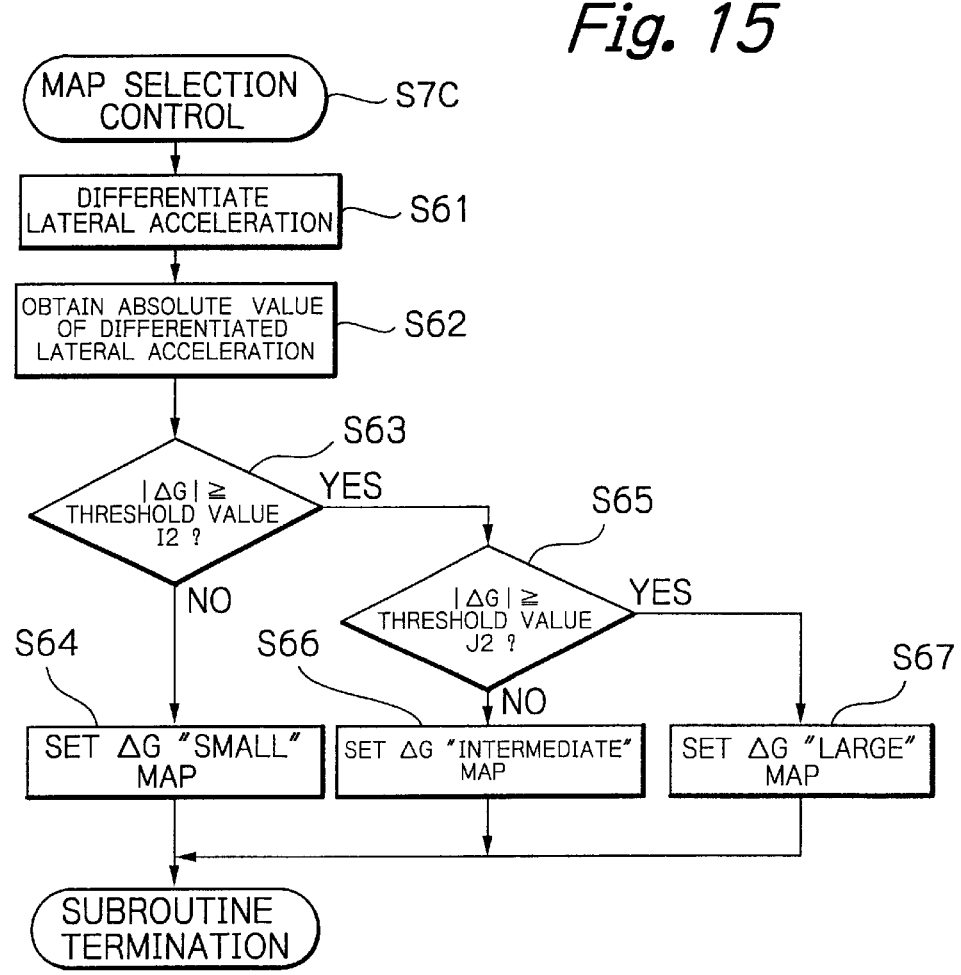
FIG. 15 is a flowchart showing a map selection control subroutine executed by a controller of a suspension control system according to a fourth embodiment of the present invention.

Next, a fourth embodiment of the present invention will be described with reference to FIGS. 15 and 16.

It should be noted that the same members or portions as those shown in FIGS. 1 to 13 are denoted by the same reference numerals, and a description thereof is omitted appropriately.

The fourth embodiment has a lateral acceleration detecting means (not shown). The controller (not shown) in the fourth embodiment has a differentiating circuit (an example of vehicle behavior detecting means), which is not shown in the figures, in place of the deceleration detecting circuit 21 shown in FIG. 10. The differentiating circuit differentiates a lateral acceleration signal from the lateral acceleration detecting means to obtain a rate of change in the lateral acceleration.

Figure 16:
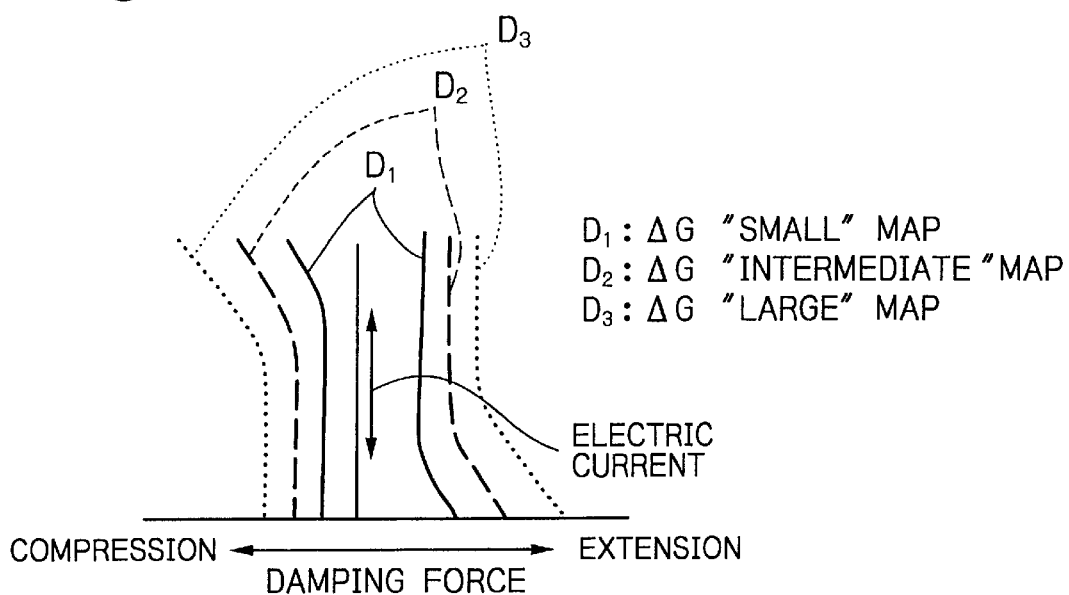
FIG. 16 is a diagram showing damping force maps stored in the controller according to the fourth embodiment.

The damping force map memory 20 (see FIG. 10) contains, as shown in FIG. 16, a $\Delta G$ "small" map D1, a $\Delta G$ "intermediate" map D2, and a $\Delta G$ "large" map D3, which show damping force-current characteristics (extension/compression inverting type). The $\Delta G$ "small" map D1, the $\Delta G$ "intermediate" map D2 and the $\Delta G$ "large" map D3 show damping force increasing in the order mentioned with respect to an electric current (actuator command signal) of equal magnitude.

When the rate of change in the lateral acceleration obtained by the differentiating circuit (not shown) has a large value, it is expected that rolling of large value will occur. When the value of the rate of change in the lateral acceleration is small, rolling of relatively small value is expected to occur. Hence, the differentiating circuit performs detection of rolling. Thus, the differentiating circuit constitutes a vehicle behavior detecting means. Further, in the fourth embodiment, damping force control is effected on the basis of the fact that when the lateral acceleration is small, the piston speed is estimated to be low, whereas when the lateral acceleration is large, the piston speed is estimated to be high.

The damping force map selecting circuit 13 (see FIG. 10) compares the rate of change in the lateral acceleration $\Delta G$ from the differentiating circuit with threshold values i2 and j2 and selects a damping force map (the $\Delta G$ "small" map D1, the $\Delta G$ "intermediate" map D2, or the $\Delta G$ "large" map D3) from the damping force map memory 20 according to the result of the comparison. Further, the damping force map selecting circuit 13 obtains an actuator command signal on the basis of the selected damping force map and the acceleration signal from the acceleration sensor 6 (see FIG. 10) and outputs the actuator command signal to the actuator.

The controller in the fourth embodiment performs main routine control similar to that shown in FIG. 3. In a map selection control subroutine (step S7C) provided in place of the map selection control subroutine (step S7) in the first embodiment, as shown in FIG. 15, the controller calculates a lateral acceleration change rate $\Delta G$ (step S61) and obtains the absolute value $|\Delta G|$ of the lateral acceleration change rate $\Delta G$ (step S62).

Subsequently, the controller judges whether the absolute value |ΔG| is not less than the threshold value i2 (step S63). If NO is the answer at step S63 (i.e. the absolute value |ΔG| is less than the threshold value i2), the controller sets the ΔG "small" map D1 (step S64).

If YES is the answer at step S63 (i.e. the absolute value |ΔG| is not less than the threshold value i2), the controller judges whether the absolute value |ΔG| is not less than the threshold value j2 (step S65).

If NO is the answer at step S65 (i.e. the absolute value |ΔG| is less than the threshold value j2), the controller sets the ΔG "intermediate" map D2 (step 566). If YES is the answer at step S65 (i.e. the absolute value |ΔG| is not less than the threshold value j2), the controller sets the ΔG "large" map D3 (step S67).

In the fourth embodiment, the controller predicts the occurrence of rolling from the absolute value |ΔGΔ of the lateral acceleration change rate ΔG and selects a damping force map (the ΔG "small" map D1, the ΔG "intermediate" map D2, or the ΔG "large" map D3) according to the result of the prediction. Then, the controller effects damping force control on the basis of the selected damping force map. Therefore, it is possible to generate damping force appropriately in accordance with a change in the level of the piston speed.

Although in the fourth embodiment the magnitude of rolling is detected from information concerning the lateral acceleration, it should be noted that the present invention is not necessarily limited thereto. For example, the magnitude of rolling may be detected from the amount of steering effort. Other methods are also usable as long as the magnitude of rolling can be detected.

Figure 17:
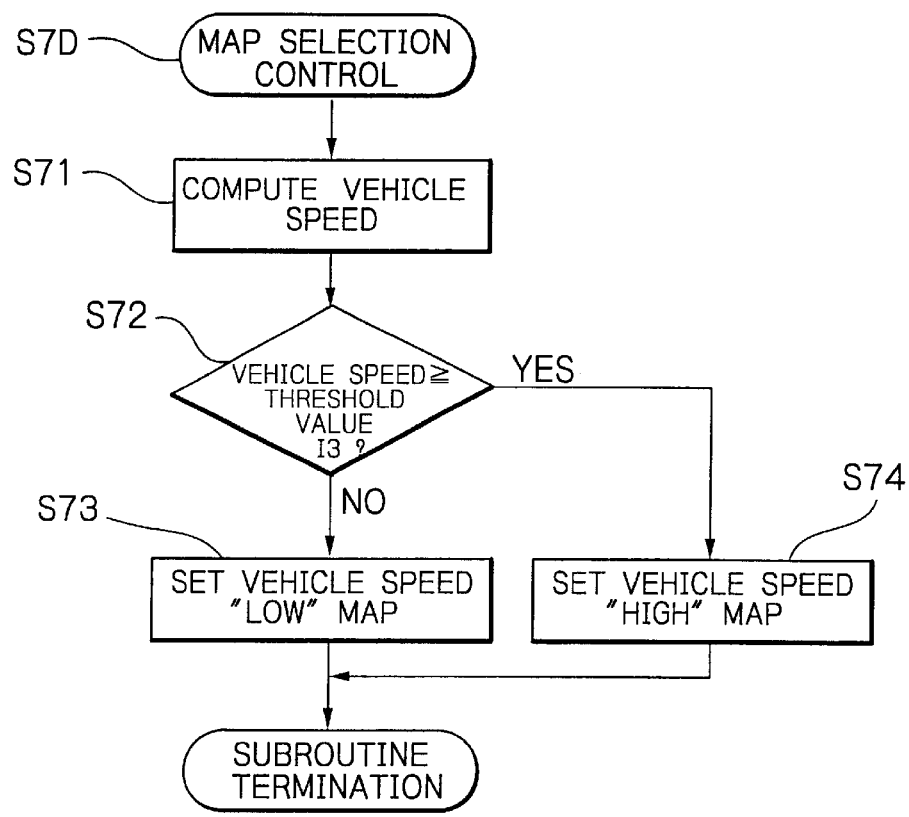
FIG. 17 is a flowchart showing a map selection control subroutine executed by a controller of a suspension control system according to a fifth embodiment of the present invention.

Next, a fifth embodiment of the present invention will be described with reference to FIGS. 17 and 18.

It should be noted that the same members or portions as those shown in FIGS. 1 to 16 are denoted by the same reference numerals, and a description thereof is omitted appropriately.

The fifth embodiment has a vehicle speed pulse generating means (not shown). The controller (not shown) in the fifth embodiment has a vehicle speed detecting circuit (an example of vehicle behavior detecting means), which is not shown in the figures, in place of the deceleration detecting circuit 21 shown in FIG. 10. The vehicle speed detecting circuit obtains the vehicle speed from vehicle speed pulses from the vehicle speed pulse generating means.

Figure 18:
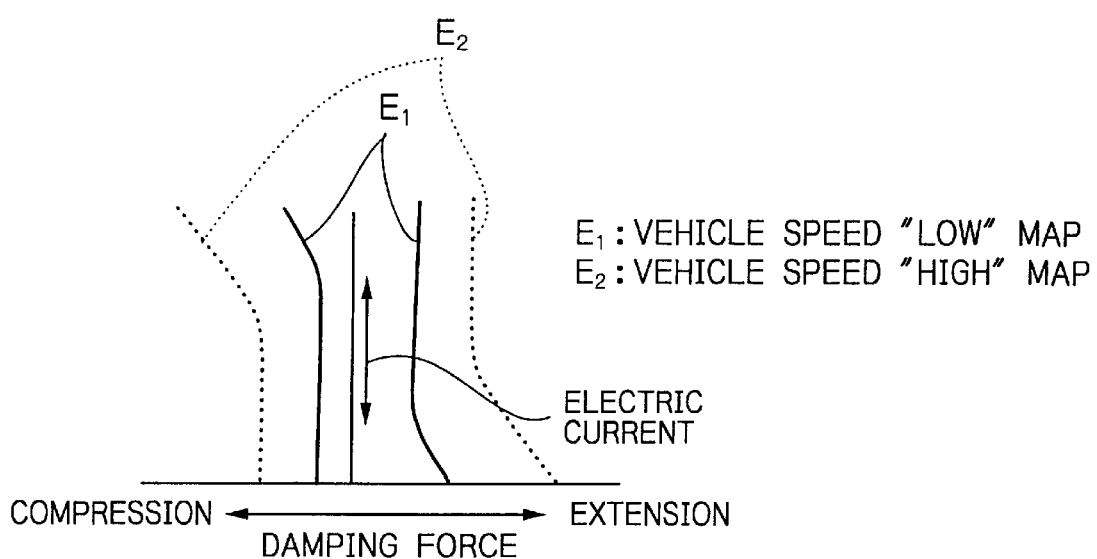
FIG. 18 is a diagram showing damping force maps stored in the controller according to the fifth embodiment.

The damping force map memory 20 (see FIG. 10) has, as shown in FIG. 18, two damping force-current characteristic curves (extension/compression inverting type) stored therein as a vehicle speed "low" map E1 and a vehicle speed "high" map E2. The vehicle speed "low" map E1 and the vehicle speed "high" map E2 show damping force increasing in the order mentioned with respect to an electric current of equal magnitude.

In general, when the value of the vehicle speed is small, the piston speed is low, whereas when the vehicle speed value becomes large under the same road surface conditions, the piston speed becomes high. The fifth embodiment effects damping force control by utilizing the above-described characteristics.

The controller in the fifth embodiment performs main routine control similar to that shown in FIG. 3. In a map selection control subroutine (step S7D) provided in place of the map selection control subroutine (step S7) in the first embodiment, as shown in FIG. 17, the controller calculates a vehicle speed first (step S71).

Subsequently, the controller judges whether the vehicle speed is not less than a threshold value i3 (step S72). If NO is the answer at step S72 (i.e. the vehicle speed is less than the threshold value i3), the controller sets the vehicle speed "low" map E1 (step S73). If YES is the answer at step S72 (i.e. the vehicle speed is not less than the threshold value i3), the controller sets the vehicle speed "high" map E2 (step S74).

In the fifth embodiment, the controller predicts a change in the level of the piston speed on the basis of the vehicle speed and selects a damping force map (the vehicle speed "low" map E1 or the vehicle speed "high" map E2) according to the result of the prediction. Then, the controller effects damping force control on the basis of the selected damping force map. Therefore, it is possible to generate damping force appropriately in accordance with a change in the level of the piston speed.

Figure 19:
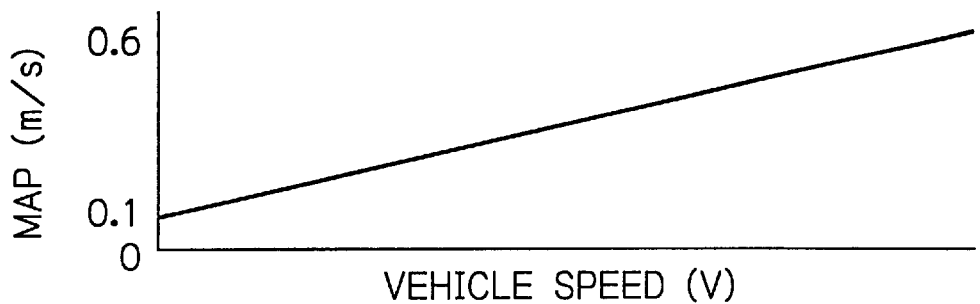
FIG. 19 is a diagram showing vehicle speed-map characteristics usable in the fifth embodiment.

In the fifth embodiment, control is effected in two steps. However, control may be effected continuously as shown in FIG. 19, by way of example.

Figure 20:
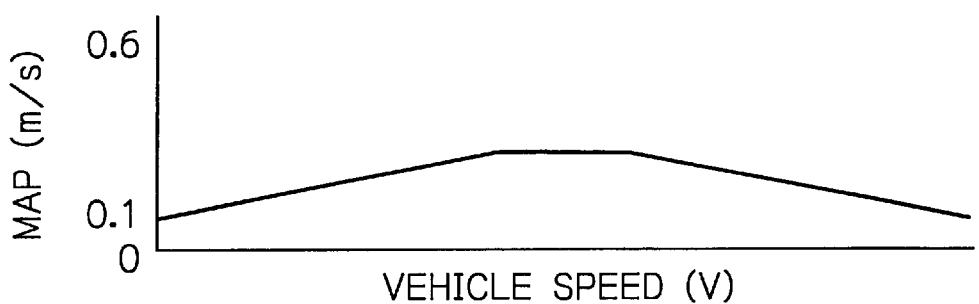
FIG. 20 is a diagram showing other vehicle speed-map characteristics usable in the fifth embodiment.

When the vehicle speed is high, there is a strong possibility of the vehicle running on an expressway. In such a case, the piston speed is low. Therefore, control may be effected by using vehicle speed-map characteristics such as those shown in FIG. 20.

Figure 21:
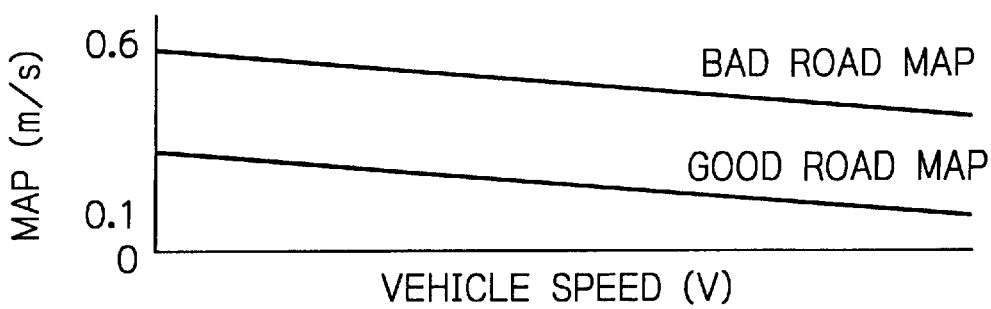
FIG. 21 is a diagram showing other vehicle speed-map characteristics usable in the fifth embodiment.

It is also possible to effect control as shown in FIG. 21 on the basis of the result of estimation of the road surface condition from a vehicle vertical motion sensor such as a vertical acceleration sensor or a vehicle height sensor.

In the fifth embodiment, damping force control may be effected for either the extension side or the compression side. It is also possible to effect damping force control for only the front wheels or only the rear wheels.

Although in the fifth embodiment the vehicle speed is detected by the vehicle speed pulse generating means, the present invention is not necessarily limited thereto. For example, the vehicle speed may be detected by using information from a speedometer. Other methods are also usable as long as the vehicle speed can be detected.

Next, a sixth embodiment of the present invention will be described with reference to FIGS. 22 to 24.

It should be noted that the same members or portions as those shown in FIGS. 1 to 21 are denoted by the same reference numerals, and a description thereof is omitted appropriately.

The sixth embodiment has a GPS receiver 30 for receiving information indicating the position of the vehicle from an external communication means (not shown), e.g. a GPS (Global Positioning System), and for outputting the received information as position information. The sixth embodiment further has a controller 7B supplied with the position information from the GPS receiver 30, as well as the spring 3, the shock absorber 4 and the actuator 5 (see FIG. 1).

Figure 22:
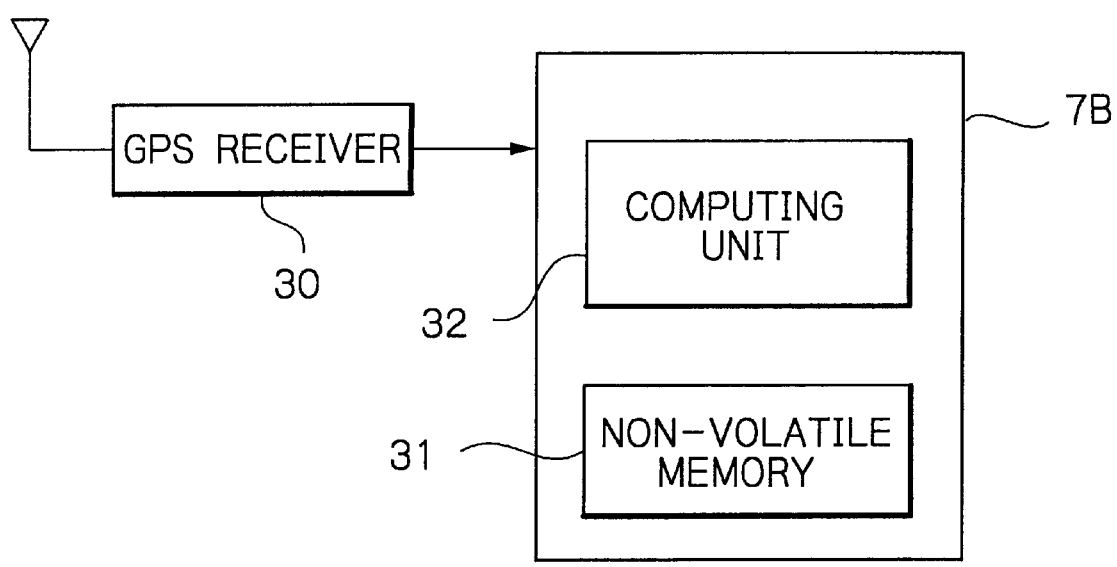
FIG. 22 is a block diagram showing a controller of a suspension control system according to a sixth embodiment of the present invention.
Figure 23:
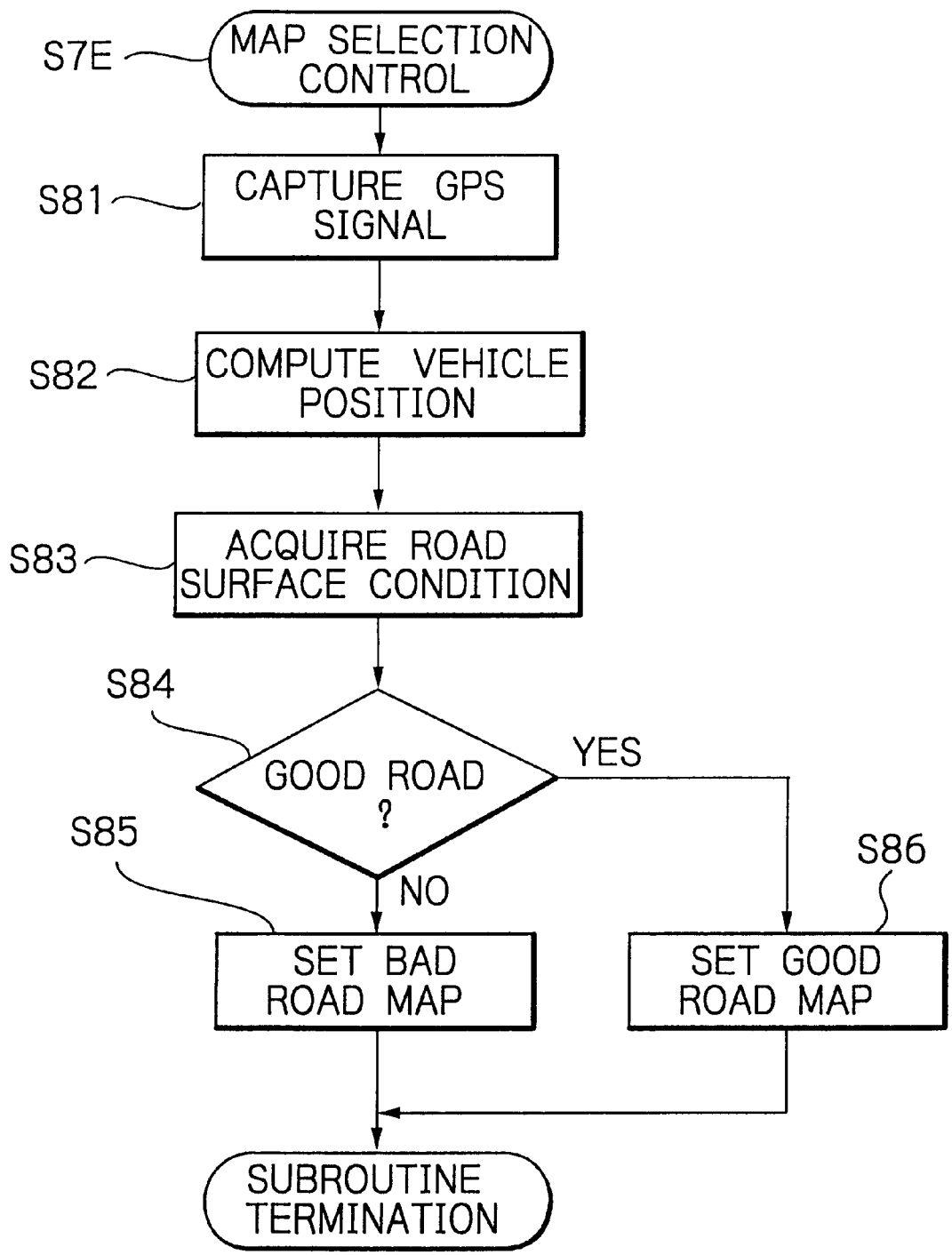
FIG. 23 is a flowchart showing a map selection control subroutine executed by the controller shown in FIG. 22.

The controller 7B in the sixth embodiment has, as shown in FIG. 22, a non-volatile memory 31 and a computing unit 32 (an example of vehicle position information acquiring means).

Figure 24:
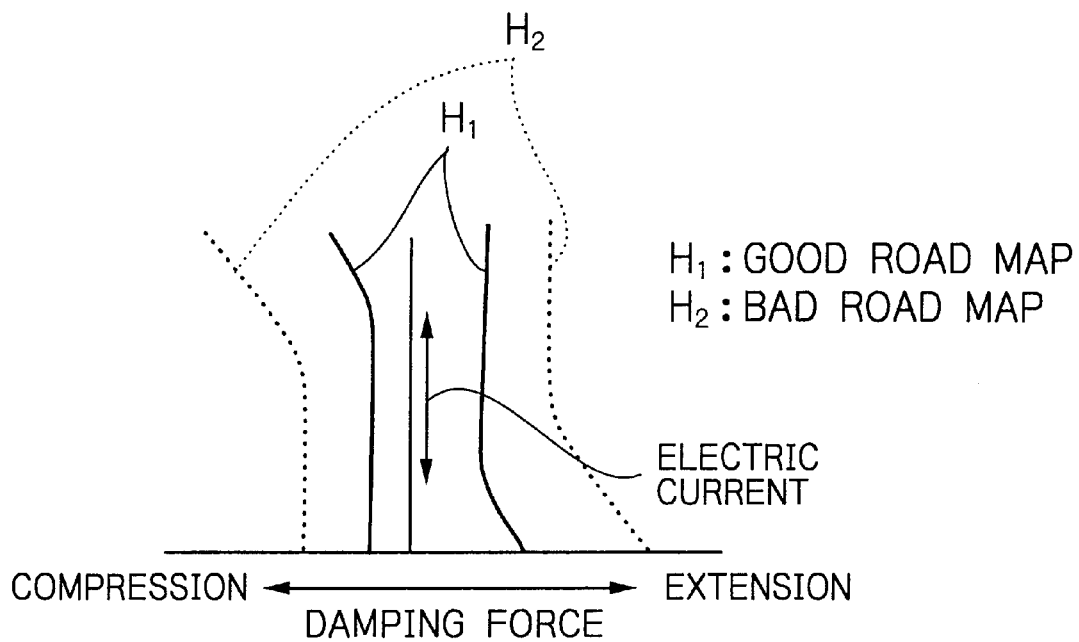
FIG. 24 is a diagram showing damping force maps stored in a non-volatile memory shown in FIG. 22.

The non-volatile memory 31 contains, as shown in FIG. 24, damping force maps showing damping force-current characteristics (extension/compression inverting type). The damping force maps include a good road map H1 and a bad road map H2. The good road map H1 and the bad road map H2 show damping force increasing in the order mentioned with respect to an electric current (actuator command signal) of equal magnitude.

The non-volatile memory 31 further contains damping force map changing information (e.g. the position and extent of each curve, the inclination angle of the road surface, and the degree of road surface unevenness) for selecting a damping force map and vehicle position information in association with each other. When particular vehicle position information is designated, the corresponding damping force map changing information is selected, and hence an appropriate damping force map is selected. The damping force map changing information includes the position and extent of each curve, the inclination angle of the road surface, the degree of road surface unevenness, etc. The damping force map changing information allows prediction of a change in the piston speed.

The computing unit 32 acquires vehicle position information on the basis of the position information from the GPS receiver 30 and obtains damping force map changing information from the vehicle position information to judge the road surface condition from the damping force map changing information. In addition, the computing unit 32 selects a damping force map according to the damping force map changing information.

Further, the computing unit 32 obtains an actuator command signal on the basis of the selected damping force map and the acceleration signal from the acceleration sensor 6 (not shown) and outputs the actuator command signal to the actuator 5.

The controller 7B arranged as stated above performs main routine control similar to that shown in FIG. 3. In a map selection control subroutine (step S7E) provided in place of the map selection control subroutine (step S7) in the first embodiment, as shown in FIG. 23, the controller 7B captures position information from the GPS receiver 30 (step S81). Then, vehicle position information is obtained (step S82) from the position information captured at step S81.

Subsequently to step S82, the controller 7B obtains damping force map changing information corresponding to the vehicle position information and acquires information indicating road surface conditions such as the degree of road surface unevenness included in the damping force map changing information (step S83).

At the subsequent step S84, the controller 7B judges whether or not the road on which the vehicle is running is a "good road" (the damping force map changing information corresponding to the vehicle position information includes information indicating whether the road is a "good road").

If NO is the answer at step S84 (i.e. the road on which the vehicle is running is not a "good road"), the controller 7B sets the bad road map H2 (step S85) and effects damping force control on the basis of the set bad road map H2.

If YES is the answer at step S84 (i.e. the vehicle is running on a "good road"), the controller 7B sets the good road map H1 (step S86) and effects damping force control on the basis of the set good road map H1.

According to the sixth embodiment, the damping force map changing information includes information indicating road surface conditions such as the degree of road surface unevenness. Therefore, it is possible to predict a piston speed on the basis of the damping force map changing information. The damping force map changing information is obtained from position information input from the GPS receiver 30. That is, on the basis of the position information, particular damping force map changing information is designated, and a damping force map (the good road map H1 or the bad road map H2) is selected on the basis of the designated damping force map changing information, i.e. data that allows prediction of the level of the piston speed. Then, damping force control is effected on the basis of the selected damping force map. Therefore, it is possible to generate damping force appropriately in accordance with a change in the level of the piston speed.

Although in this embodiment the selection of a damping force map is made on the basis of position information from the GPS receiver 30, by way of example, the arrangement may be such that a vehicle speed detecting means for detecting the vehicle speed is additionally provided, and the vehicle speed detected by the vehicle speed detecting means is taken in to use it for the selection of a damping force map in combination with the position information. The use of the vehicle speed for the selection of a damping force map in combination with other information allows map selection to be made even more accurately and hence permits damping force control to be effected with high accuracy.

It is also possible to capture point information as in the case of a railway vehicle (i.e. information obtained from an information transmission source installed along a railway, which indicates a kilopost, curve, crossing, point and so forth of the railway) and to select a damping force map on the basis of the contents of the captured information. The selection of a damping force map may be made directly in response to a command given externally. In the railway vehicle, the shock absorber may be provided so as to generate damping force with respect to relative movement in the lateral direction between the vehicle body (sprung member) and the truck (unsprung member). Control is effected on the basis of the travel velocity of the sprung member. In this case, the term "travel velocity" means the velocity in the horizontal direction of the sprung member.

Further, damping force control may be effected for either the extension side or the compression side. It is also possible to effect damping force control for only the front wheels or only the rear wheels.

In the sixth embodiment, a description has been given on an example in which a vehicle speed detecting means is provided and the vehicle speed detected by the vehicle speed detecting means is used to select a damping force map in combination with the position information. It should be noted that the above-described arrangement is also applicable to the first to fifth embodiments. In each of the embodiments, it is possible to provide a vehicle speed detecting means and to add information about the vehicle speed detected by the vehicle speed detecting means to information for selecting a damping force map. With this arrangement, the accuracy of the damping force map selection improves, and hence the damping force control can be effected with high accuracy.

According to the present invention, the controller has a plurality of maps showing correspondence relation between damping force and an actuator command signal, selects a damping force map corresponding to the piston speed level estimated by a piston speed estimating means and outputs an actuator command signal on the basis of the selected map. Therefore, it is possible to suppress the excess or deficiency in damping force control due to variations in the level of piston speed of the shock absorber and hence possible to achieve favorable vibration control.

In an example wherein a damping force map is selected according to the road surface condition detected by a road surface condition detecting means, an optimal damping force map can be selected according to whether the road surface condition is an ordinary road or a rough road. Accordingly, it is possible to realize optimal damping force control according to the road surface condition.

In an example wherein the suspension control system has a sprung vibration detecting means for detecting the acceleration frequency of the sprung member and the road surface condition detecting means detects the road surface condition according to the value of the acceleration frequency, it is possible to realize optimal damping force control according to the road surface condition by using a relatively low-cost sprung vibration detecting means, e.g. an acceleration sensor.

In an example wherein the actuator is controlled on the basis of a damping force map selected according to the behavior of the vehicle detected by a vehicle behavior detecting means, it is possible to suppress the excess or deficiency in damping force control due to variations in the piston speed of the shock absorber caused by the behavior of the vehicle and hence possible to achieve favorable vibration control.

When the behavior of the vehicle is dive of the vehicle, it is possible to select an optimal damping force map in conformity to the dive of the vehicle and hence possible to realize optimal damping force control in accordance with the magnitude of the dive of the vehicle.

When the behavior of the vehicle is squat of the vehicle, it is possible to select an optimal damping force map in conformity to the squat of the vehicle and hence possible to realize optimal damping force control in accordance with the magnitude of the squat of the vehicle.

When the behavior of the vehicle is rolling of the vehicle, it is possible to select an optimal damping force map in conformity to the rolling of the vehicle and hence possible to realize optimal damping force control in accordance with the magnitude of the rolling of the vehicle.

In an example wherein the actuator is controlled on the basis of a damping force map selected according to information about the position of the vehicle acquired by a vehicle position information acquiring means, it is possible to suppress the excess or deficiency in damping force control in accordance with the condition of the road surface where the vehicle is situated, and hence possible to achieve favorable vibration control.

In any of the above-described examples, a damping force map can be selected on the basis of the vehicle speed because the vehicle speed is generally in correspondence relation to the piston speed of the shock absorber. By selecting a damping force map on the basis of the vehicle speed, it is possible to suppress the excess or deficiency in damping force control due to variations in the piston speed of the shock absorber and hence possible to achieve favorable vibration control. In addition, the use of the vehicle speed in combination with other information allows map selection to be made even more accurately and hence permits damping force control to be effected with high accuracy.

What is claimed is:

1. A suspension control system comprising:
   a shock absorber of a variable damping characteristic type to be interposed between sprung and unsprung members of a vehicle;
   an actuator for changing damping characteristics of said shock absorber;
   a velocity detecting device for detecting velocity of said sprung member;
   a piston speed estimating device for estimating a level of piston speed of a piston performing sliding movement inside said shock absorber; and
   a controller having damping force maps for showing relationships between damping force and an actuator command signal, respectively, in correspondence to various levels of the piston speed;
   wherein said controller is to obtain necessary damping force from the velocity of the sprung member, and further, said controller is to select a damping force map, from said damping force maps, corresponding to the level of piston speed estimated by said piston speed estimating device and is to output the actuator command signal on the basis of the selected damping force map.

2. The suspension control system according to claim 1, further comprising:
   a vehicle speed detecting device for detecting a vehicle speed;
   wherein said controller is to also use information about the vehicle speed detected by said vehicle speed detecting device as information for selecting a damping force map.

3. The suspension control system according to claim 1, wherein said piston speed estimating device comprises a road surface condition detecting device for detecting a road surface condition, and said controller is to select a damping force map according to the road surface condition detected by said road surface condition detecting device.

4. The suspension control system according to claim 3, further comprising:
   a vehicle speed detecting device for detecting a vehicle speed;
   wherein said controller is to also use information about the vehicle speed detected by said vehicle speed detecting device as information for selecting a damping force map.

5. The suspension control system according to claim 3, further comprising:
   a sprung vibration detecting device for detecting an acceleration frequency of the sprung member;
   wherein said road surface condition detecting device is to detect the road surface condition according to a value of the acceleration frequency.

6. The suspension control system according to claim 5, further comprising:
   a vehicle speed detecting device for detecting a vehicle speed;
   wherein said controller is to also use information about the vehicle speed detected by said vehicle speed detecting device as information for selecting a damping force map.

7. The suspension control system according to claim 1, wherein said piston speed estimating device comprises a vehicle behavior detecting device for detecting behavior of the vehicle, and said controller is to select a damping force map according to the behavior of the vehicle detected by said vehicle behavior detecting device.

8. The suspension control system according to claim 7, further comprising:
   a vehicle speed detecting device for detecting a vehicle speed;
   wherein said controller is to also use information about the vehicle speed detected by said vehicle speed detecting device as information for selecting a damping force map.

9. The suspension control system according to claim 7, wherein said behavior detecting device is for detecting dive of the vehicle as the behavior of the vehicle.

10. The suspension control system according to claim 9, further comprising:
    a vehicle speed detecting device for detecting a vehicle speed;

wherein said controller is to also use information about the vehicle speed detected by said vehicle speed detecting device as information for selecting a damping force map.

11. The suspension control system according to claim 7, wherein said behavior detecting device is for detecting squat of the vehicle as the behavior of the vehicle.

12. The suspension control system according to claim 11, further comprising:
a vehicle speed detecting device for detecting a vehicle speed;
wherein said controller is to also use information about the vehicle speed detected by said vehicle speed detecting device as information for selecting a damping force map.

13. The suspension control system according to claim 7, wherein said behavior detecting device is for detecting rolling of the vehicle as the behavior of the vehicle.

14. The suspension control system according to claim 13, further comprising:
a vehicle speed detecting device for detecting a vehicle speed;
wherein said controller is to also use information about the vehicle speed detected by said vehicle speed detecting device as information for selecting a damping force map.

15. The suspension control system according to claim 1, wherein said piston speed estimating device comprises a vehicle position information acquiring device for acquiring information about a position of the vehicle from an external communication system, and said controller is to select a damping force map according to the information about the position of the vehicle acquired by said vehicle position information acquiring device.

16. The suspension control system according to claim 15, further comprising:
a vehicle speed detecting device for detecting a vehicle speed; wherein said controller is to also use information about the vehicle speed detected by said vehicle speed detecting device as information for selecting a damping force map.

* * * * *